United States Patent
Kohara et al.

(10) Patent No.: US 8,339,358 B2
(45) Date of Patent: Dec. 25, 2012

(54) INPUT APPARATUS AND IMAGE FORMING APPARATUS

(75) Inventors: Tasuku Kohara, Kanagawa (JP); Kenichi Yamada, Kanagawa (JP); Kazuo Koike, Kanagawa (JP); Taisuke Omi, Kanagawa (JP); Tsuyoshi Endoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 699 days.

(21) Appl. No.: 12/430,556

(22) Filed: Apr. 27, 2009

(65) Prior Publication Data

US 2009/0316954 A1    Dec. 24, 2009

(30) Foreign Application Priority Data

Jun. 18, 2008   (JP) .................... 2008-158739

(51) Int. Cl.
*G09G 5/00* (2006.01)
(52) U.S. Cl. ........ 345/156; 382/103
(58) Field of Classification Search .......... 345/156, 345/204

See application file for complete search history.

(56) References Cited

U.S. PATENT DOCUMENTS

| | | | |
|---|---|---|---|
| 5,602,379 A * | 2/1997 | Uchimura et al. | 235/462.11 |
| 5,640,467 A | 6/1997 | Yamashita et al. | |
| 5,767,842 A * | 6/1998 | Korth | 345/168 |
| 5,987,227 A | 11/1999 | Endo et al. | |
| 6,226,102 B1 | 5/2001 | Koike et al. | |
| 6,614,422 B1 * | 9/2003 | Rafii et al. | 345/168 |
| 6,832,010 B2 | 12/2004 | Miyazaki et al. | |
| 7,042,442 B1 * | 5/2006 | Kanevsky et al. | 345/169 |
| 7,372,503 B2 * | 5/2008 | Maeda et al. | 348/376 |
| 7,382,938 B2 | 6/2008 | Kizaki et al. | |
| 7,502,141 B2 | 3/2009 | Kowada et al. | |
| 7,518,742 B2 | 4/2009 | Toyonori et al. | |
| 2002/0057386 A1 * | 5/2002 | Otera | 348/744 |
| 2003/0128190 A1 * | 7/2003 | Wilbrink et al. | 345/169 |
| 2007/0059032 A1 | 3/2007 | Yamada et al. | |
| 2007/0212101 A1 | 9/2007 | Koike et al. | |
| 2007/0263176 A1 * | 11/2007 | Nozaki et al. | 353/69 |
| 2008/0069664 A1 | 3/2008 | Nagata et al. | |
| 2008/0089017 A1 | 4/2008 | Yamada et al. | |
| 2008/0199201 A1 | 8/2008 | Kohara et al. | |
| 2008/0307329 A1 | 12/2008 | Endoh | |
| 2009/0060612 A1 | 3/2009 | Kohara et al. | |
| 2009/0066644 A1 | 3/2009 | Endoh et al. | |
| 2009/0102110 A1 | 4/2009 | Endoh et al. | |

FOREIGN PATENT DOCUMENTS

| | | |
|---|---|---|
| JP | 2005-10394 | 1/2005 |
| JP | 2007-219966 | 8/2007 |

* cited by examiner

*Primary Examiner* — Amare Mengistu
*Assistant Examiner* — Shawna Stepp Jones
(74) *Attorney, Agent, or Firm* — Oblon, Spivak, McClelland, Maier & Neustadt, L.L.P.

(57) ABSTRACT

An input apparatus for enabling a user to enter an instruction into a main apparatus has high durability and offers superior operability. The input apparatus includes a table device having a table with a variable size. An image of plural virtual keys that is adapted to the size of the table is projected by a projector unit onto the table. Position information about a finger of the user that is placed on the table is detected by a position detecting device contactlessly. One of the plural virtual keys that corresponds to the position of the finger of the user detected by the position detecting device is detected by a key detecting device based on information about the image of the plural virtual keys and a result of the detection made by the position detecting device.

18 Claims, 24 Drawing Sheets

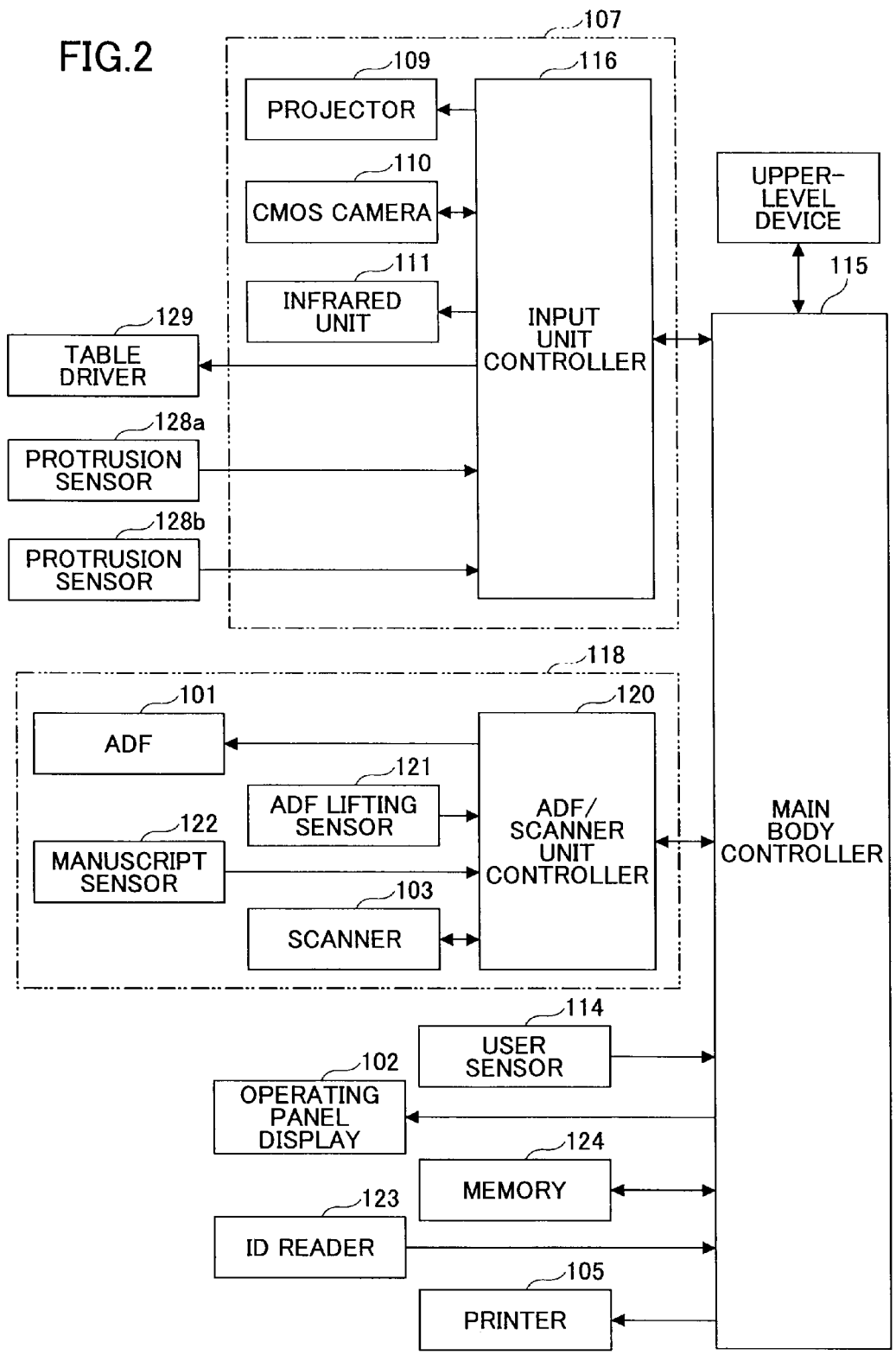

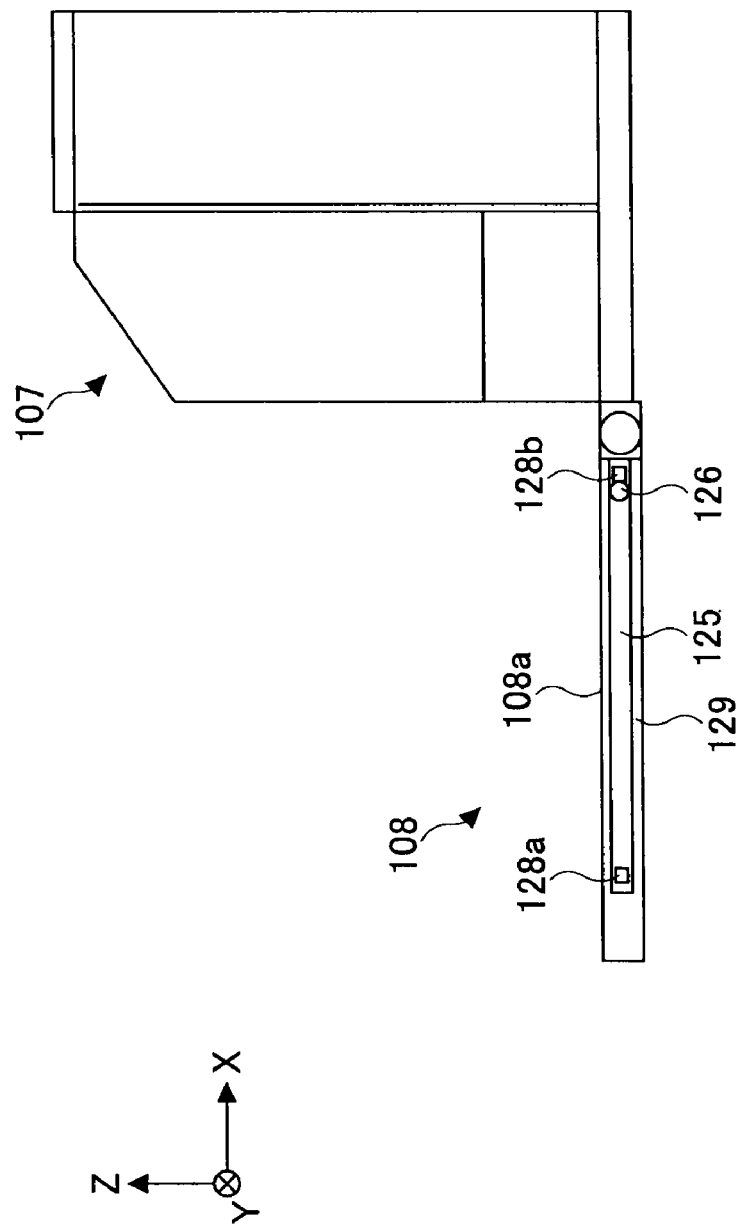

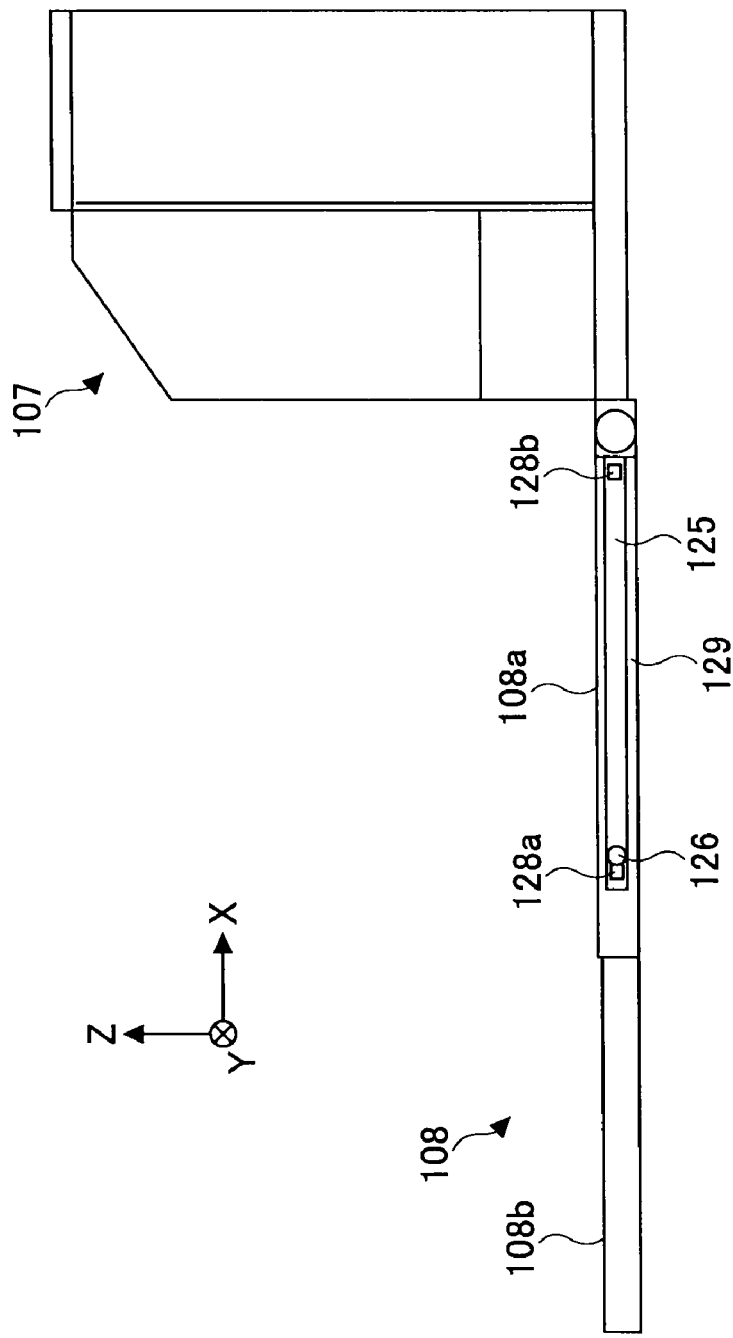

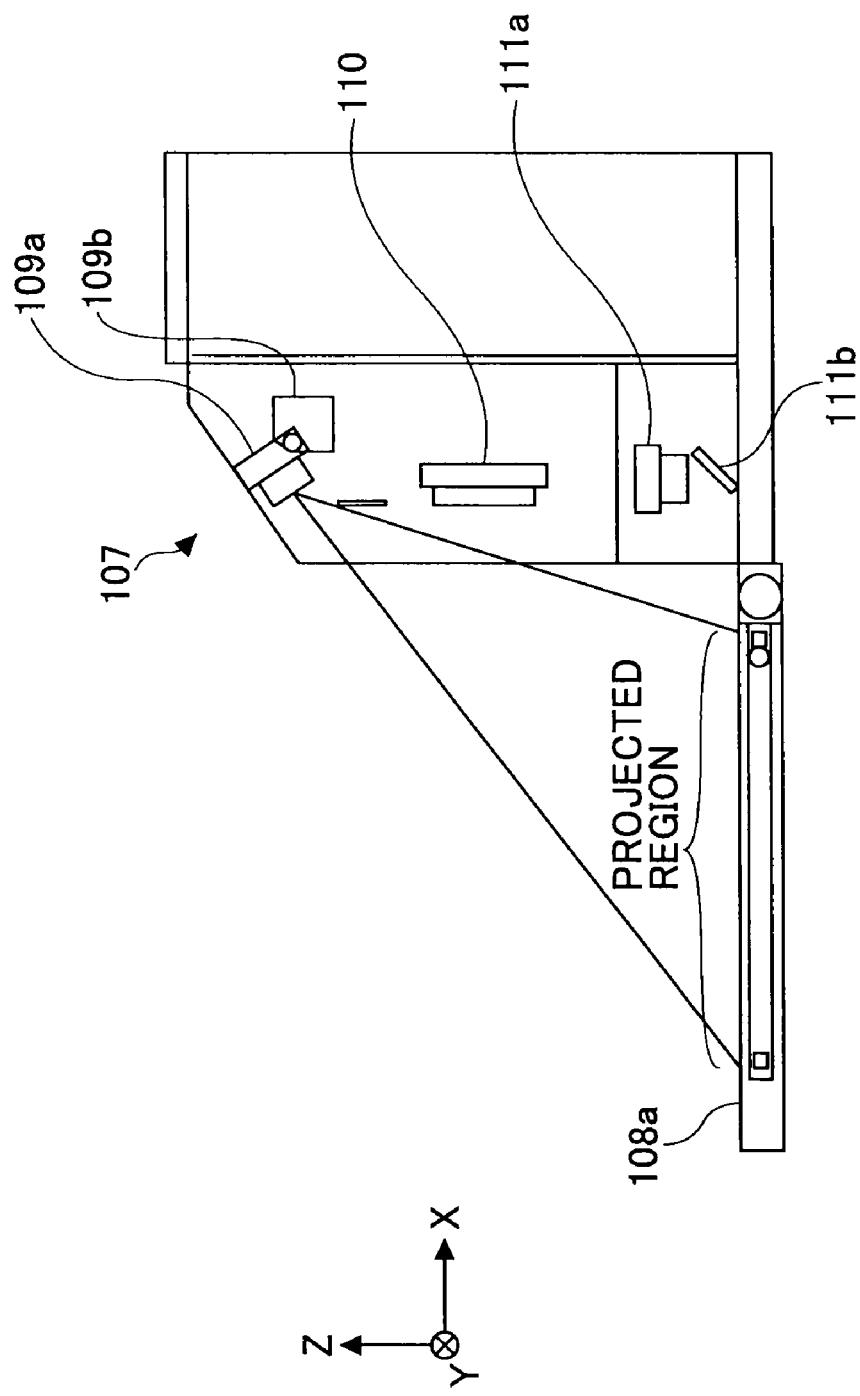

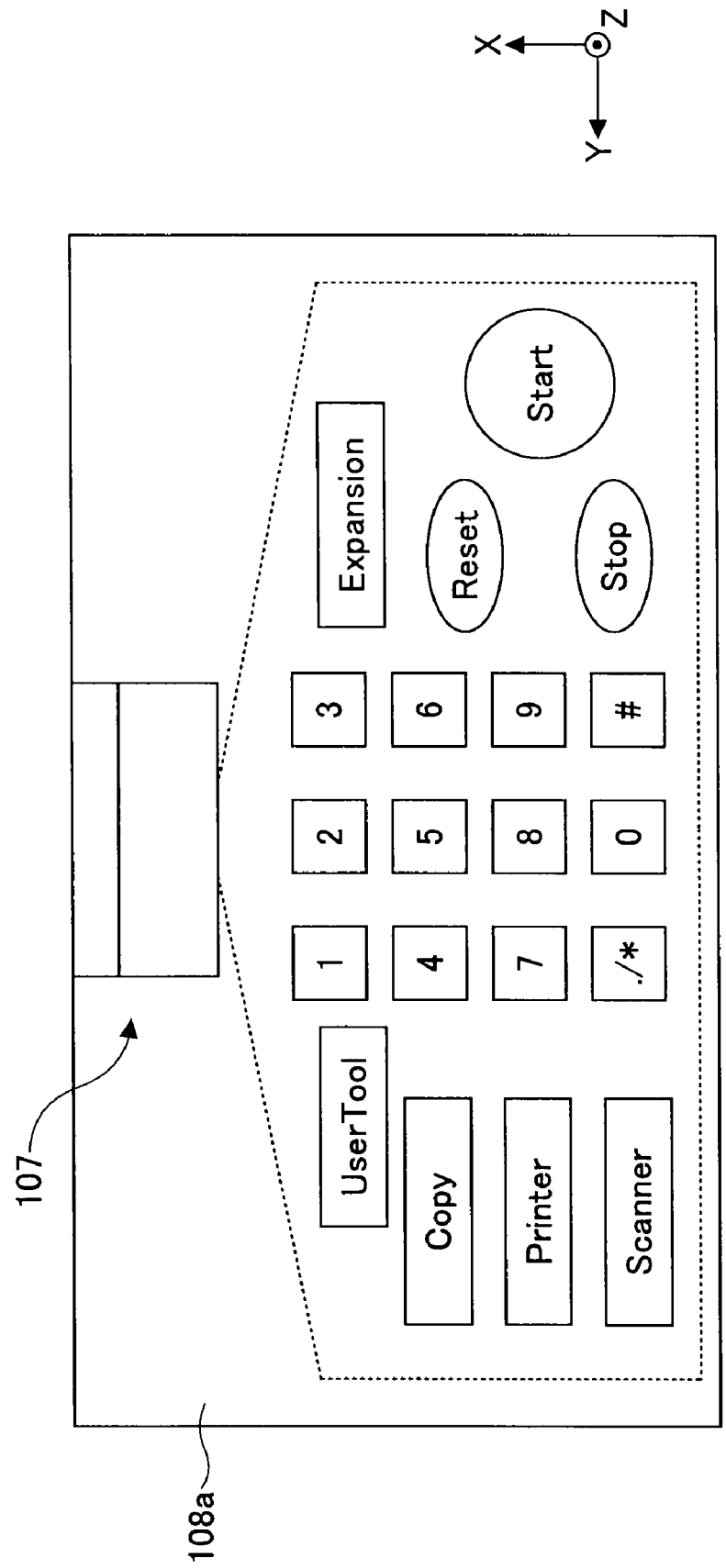

INPUT APPARATUS AND IMAGE FORMING APPARATUS

BACKGROUND OF THE INVENTION

1. Field of the Invention

The present invention relates to input apparatuses and image forming apparatuses, and more particularly to an input apparatus that is used when a user inputs an instruction into a main apparatus. The present invention also relates to an image forming apparatus equipped with the input apparatus.

2. Description of the Related Art

An image forming apparatus, such as a copy machine or a printer, typically has an operating panel with a display unit. The display unit may display plural input keys that a user can use to enter an instruction for executing a job. The display unit may also display various other information, such as a status of the image forming apparatus or various messages to the user.

For example, Japanese Laid-Open Patent Application No. 2005-010394 discloses an image forming apparatus that determines an optimum operation position based on physical information about the user, such as his or her height or the use of a wheelchair. In this technology, the height of an operating unit including an operating panel and the height of the ejected-sheet tray are increased or decreased in a linked manner. However, because the image forming apparatus employs mechanical keys, those keys that are frequently used are liable to fail, in which case the entire operating panel needs to be replaced.

Japanese Laid-Open Patent Application No. 2007-219966 discloses a projection input apparatus capable of projecting a keyboard with an appropriate size under different conditions, such as the projected distance. The publication also discloses an information terminal equipped with such projection input apparatus. However, many of the modern image forming apparatuses have multiple functions and offer a wide variety of input items (input menu). Thus, the use of the projection input apparatus with the latest image forming apparatus leads to reduced operability.

SUMMARY OF THE INVENTION

It is therefore an object of the present invention to provide an input apparatus and an image forming apparatus in which one or more of the problems of the related art are eliminated.

A more specific object of the present invention is to provide an input apparatus that is highly durable and offers excellent operability.

Another object of the present invention is to provide an image forming apparatus that is highly durable and offers excellent operability.

According to one aspect of the present invention, an input apparatus for enabling a user to enter an instruction into a main apparatus includes a table device having a table with a variable size; a projector unit configured to project an image of plural virtual keys that is adapted to the size of the table onto the table; a position detecting device configured to contactlessly detect position information about a finger of the user that is placed on the table; and a key detecting device configured to detect one of the plural virtual keys that corresponds to the position of the finger of the user detected by the position detecting device, based on information about the image of the plural virtual keys and a result of the detection made by the position detecting device.

According to another aspect of the present invention, an image forming apparatus for forming an image based on an instruction entered by a user includes the above input apparatus for enabling the user to enter the instruction, and a main apparatus for forming the image in accordance with the instruction entered by the user via the input apparatus.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 2 shows a block diagram of the multifunction peripheral shown in FIG. 1;

FIG. 3A is a side view of an input unit of the multifunction peripheral, wherein a second table is retracted in a first table;

FIG. 3B is a side view of the input unit wherein the second table is drawn out of the first table;

FIG. 8A is a side view of the input unit illustrating a projected region when the second table is retracted in the first table;

FIG. 8B shows a virtual key image projected in the projected region shown in FIG. 8A;

DETAILED DESCRIPTION OF THE PREFERRED EMBODIMENTS

Figure 1:
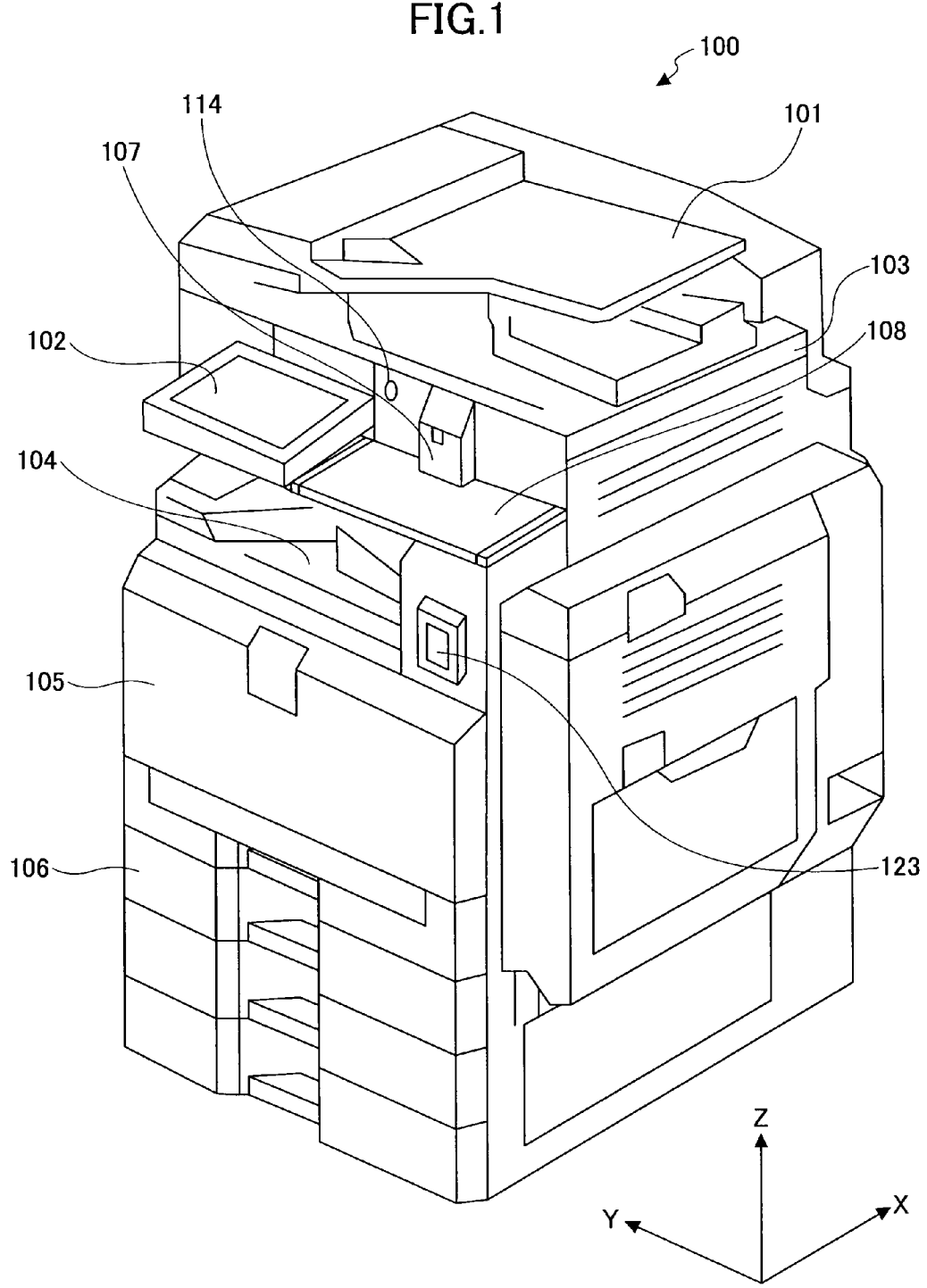
FIG. 1 is a perspective view of a multifunction peripheral according to an embodiment of the present invention.

Hereafter, embodiment of the present invention are described with reference to FIGS. 1 through 20. FIG. 1 shows a multifunction peripheral 100 as an image forming apparatus according to an embodiment of the present invention. FIG. 2 shows a block diagram illustrating the control relationships among various units of the multifunction peripheral 100. The arrows shown in FIG. 2 indicate the general flow of representative signals or information and not the entire connection relationships among all of the blocks.

The multifunction peripheral 100 includes an input unit 107; an ADF (automatic document feeder)/scanner unit 118; a projection table unit 108; a printer 105; a sheet tray 106; an ejected-sheet tray 104; a user sensor 114; an operating panel display unit 102; an ID reader 123; a memory 124; and a main body control unit 115.

The input unit 107 includes a projector unit 109; a CMOS (complementary metal-oxide semiconductor) camera 110; an infrared device 111; and an input unit control unit 116.

The ADF/scanner unit 118 includes an ADF 101, which is an automatic manuscript transport device; an ADF lift sensor 121; a manuscript sensor 122; a scanner 103; and an ADF/scanner unit control unit 120.

The ADF 101 is disposed at the top of the multifunction peripheral 100, above the scanner 103 (on a +Z side). The ADF 101 includes a manuscript tray on which one or more sheets of a manuscript can be set. The ADF 101 transports the manuscript set on the manuscript tray onto an upper surface (which may be a glass surface) of the scanner 103, one sheet at a time.

The manuscript sensor 122 is a sensor for detecting whether a manuscript is set on the manuscript tray of the ADF 101. The manuscript sensor 122 supplies an output signal to the ADF/scanner unit control unit 120.

The ADF 101 can be separated from the scanner 103. Specifically, the ADF 101 is fixed on its +X end alone in such a manner that the ADF 101 can be rotated about an +X end axis by raising the −X end of the ADF 101. Thus, when copying a bound manuscript, for example, the ADF 101 can be lifted from the scanner 103 allowing the manuscript to be placed on the upper surface of the scanner 103.

The ADF lift sensor 121 is a sensor for detecting whether the ADF 101 is lifted from the scanner 103. The ADF lift sensor 121 supplies an output signal to the ADF/scanner unit control unit 120.

The ADF/scanner unit control unit 120 controls the ADF 101 and the scanner 103 based on the output signals from the manuscript sensor 122 and the ADF lift sensor 121, as well as an instruction from the main body control unit 115.

The scanner 103 reads image information in the manuscript placed on its upper surface. When the multifunction peripheral 100 functions as a copy machine, the image information read is sent to the printer 105. The image information may be sent directly from the scanner 103 to the printer 105; or it may be sent to the printer 105 via the ADF/scanner unit control unit 120 or the main body control unit 115. When the multifunction peripheral 100 functions as a scanner, the image information thus read may be stored in the memory 124. In this case, the image information may be sent directly from the scanner 103 to the memory 124, or via the ADF/scanner unit control unit 120 or the main body control unit 115.

The user sensor 114 is a sensor for detecting whether there is a user at the front (i.e., on the −X side) of the multifunction peripheral 100. The user sensor 114 supplies an output signal to the main body control unit 115.

The operating panel display unit 102 displays various messages or the like based on an instruction from the main body control unit 115.

The ID reader 123 is used by the user when entering a user ID. Upon entry of the user ID, the main body control unit 115 is notified of the user ID. The user ID may be entered either by a key input method or via a card reader reading an ID card in a contacted or contactless manner.

The memory 124 stores user information including information about virtual keys for each user ID. The sheet tray 106 stores printing sheets.

When the multifunction peripheral 100 functions as a copy machine, the printer 105 takes out one of the printing sheets from the sheet tray 106 and may then print the image information read by the scanner 103 on the printing sheet. When the multifunction peripheral 100 functions as a printer, the printer 105 may print image information transmitted from a higher-level device (such as a personal computer). The printing sheet with the image information printed thereon is ejected onto the ejected-sheet tray 104.

The projection table unit 108 is disposed on the front side of the multifunction peripheral 100 and is positioned so that a standing user can easily place his or her finger on the projection table unit 108.

In accordance with the present embodiment, as shown in FIGS. 3A and 3B, the projection table unit 108 includes a first table 108a having an internal space; a second table 108b that can be housed within the first table 108a; and a table drive unit 129 configured to drive the second table 108b in the X axis direction. The first table 108a and the second table 108b may be collectively referred to as "the table".

The second table 108b has a protrusion 126 at the +X end on the −Y side. At both ends within the first table 108a in the Y axis direction, rails 125 extend in the X axis direction. The second table 108b rests on the rails 125.

Further, at the −Y side of the first table 108a, there are disposed a first protrusion sensor 128a on the −X end and a second protrusion sensor 128b on the +X end. These protrusion sensors 128a and 128b detect a contact of the protrusion 126 of the second table 108b therewith at the respective ends of the first table 108a.

When the second table 108b is drawn out of the first table 108a, the protrusion 126 of the second table 108b contacts the protrusion sensor 128a at a predetermined drawn-out position. When the second table 108b is put back into the first table 108a, the protrusion 126 contacts the protrusion sensor 128b at a predetermined housed position. Each of the protrusion sensors supplies an output signal to the input unit control unit 116.

Figure 4:
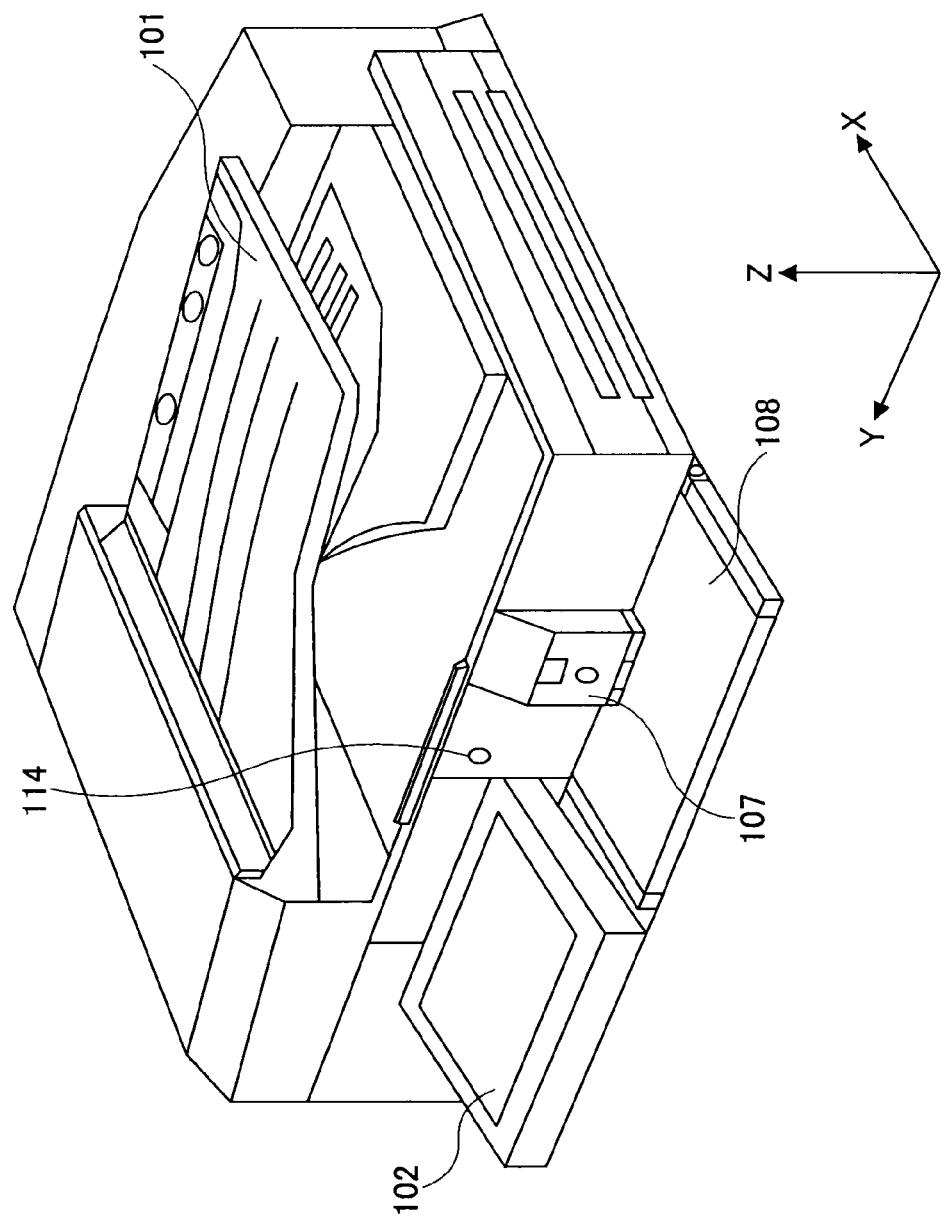
FIG. 4 is a perspective view of an upper part of the multifunction peripheral, illustrating the second table in a retracted position.
Figure 5:
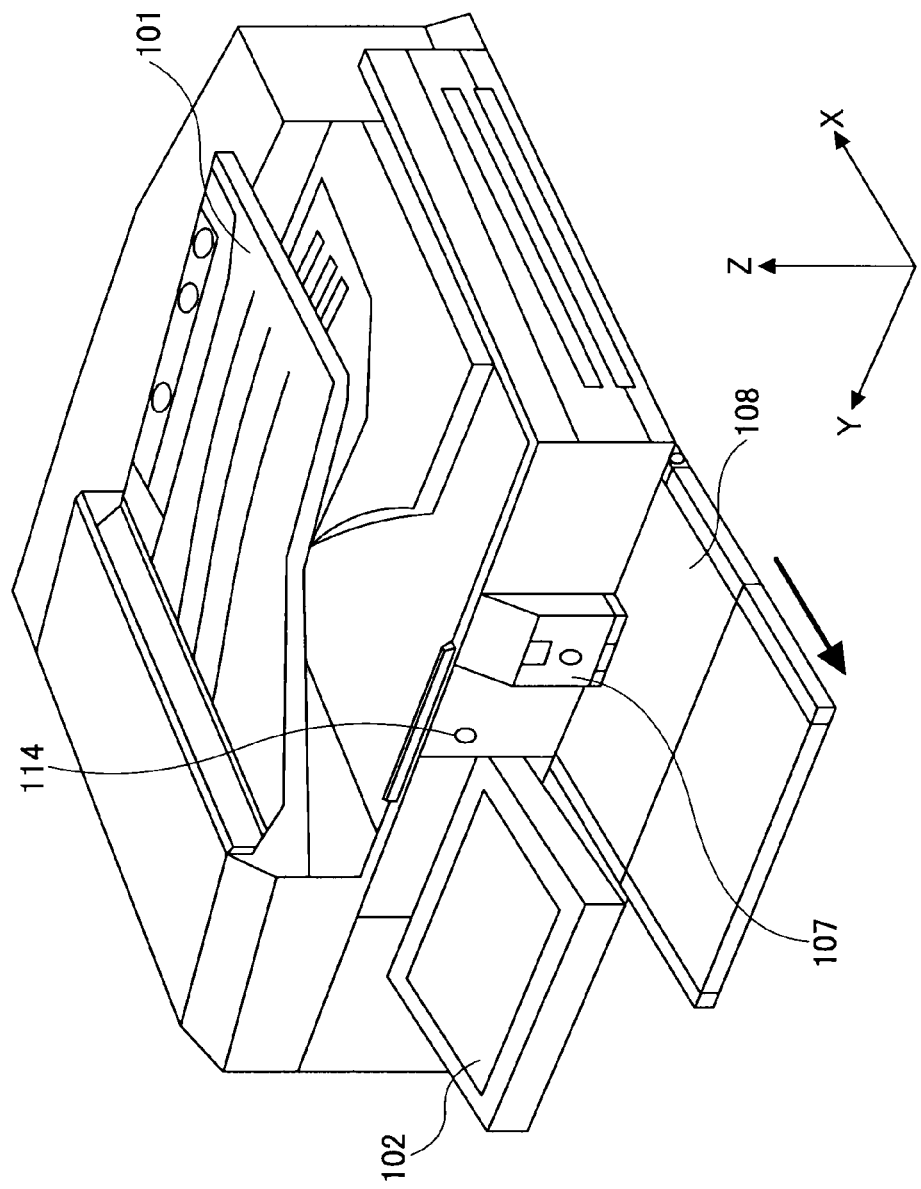
FIG. 5 is a perspective view of the upper part of the multifunction peripheral, illustrating the second table in a drawn-out position.

The second table 108b is driven by the table drive unit 129 in accordance with an instruction from the input unit control unit 116. Thus, in the projection table unit 108, the available size of the table can be changed, as shown in FIGS. 4 and 5, for example.

Figure 6:
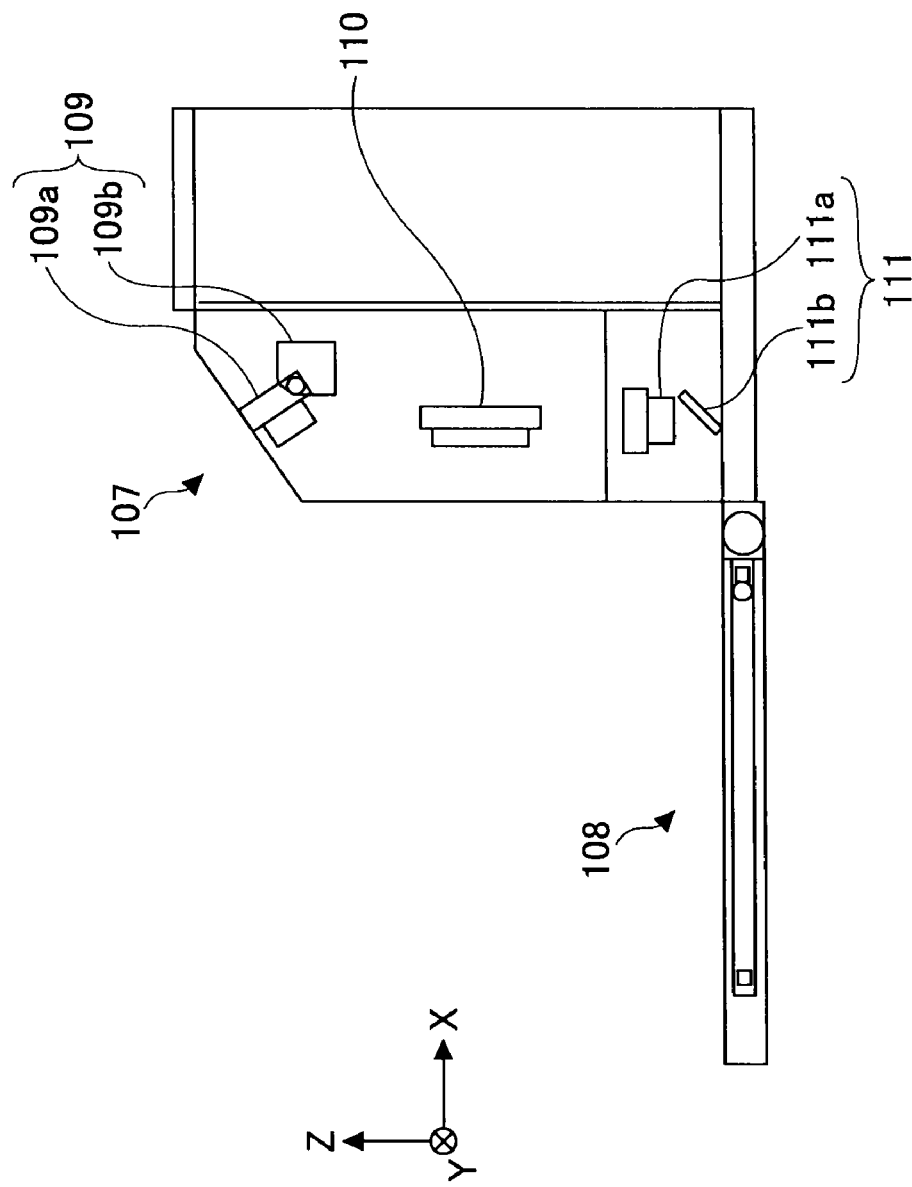
FIG. 6 is a side view of the input unit of the multifunction peripheral, illustrating an arrangement of various units within the input unit.

The input unit 107 is disposed on the +X side of the projection table unit 108. The projector unit 109, the CMOS camera 110, and the infrared device 111 may be retained within the casing of the input unit 107 in a predetermined positional relationship, as shown in FIG. 6.

In the illustrated example, the projector unit 109 is disposed at the +Z end in the casing of the input unit 107. The projector unit 109 includes a projector 109a and a projection drive mechanism 109b. The projector 109a projects a virtual key image on the table of the projection table unit 108. The projection drive mechanism 109b can rotate the projector 109a in order to change the size of a region (which may be hereafter referred to as a "projected region") on the table in which the virtual key image is projected.

Figure 7:
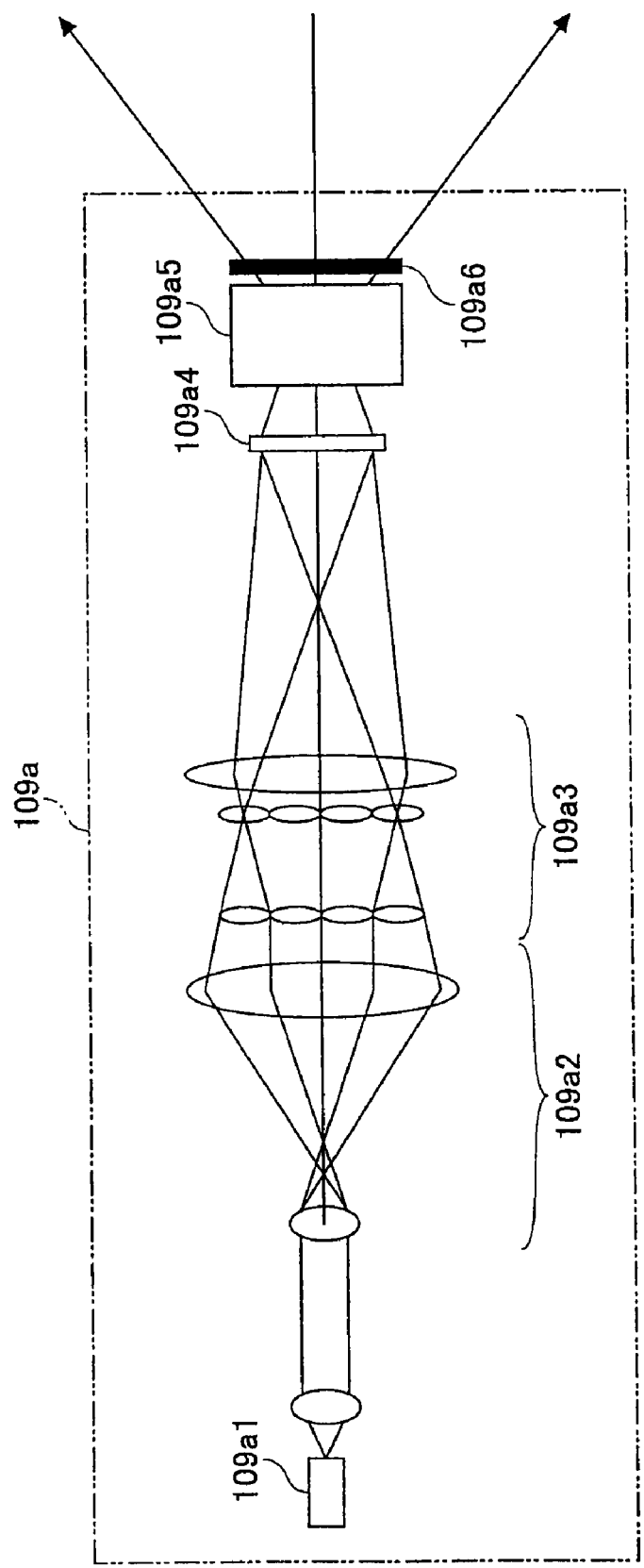
FIG. 7 shows a structure of a projector unit of the multifunction peripheral according to the present embodiment.

With reference to FIG. 7, the projector 109a includes a light source unit 109a1, a collimating optical system 109a2, an integrator optical system 109a3, a liquid crystal panel 109a4, and a projection lens 109a5.

The light source unit 109a1 outputs light that is incident on the liquid crystal panel 109a4 via the collimating optical system 109a2 and the integrator optical system 109a3. The light incident on the liquid crystal panel 109a4 is modulated in accordance with projection image data and then enlarged and projected by the projection lens 109a5 onto the table. The lenses in the optical system are adjusted to minimize distortion or blurring in the image projected on the table.

Figure 9A:
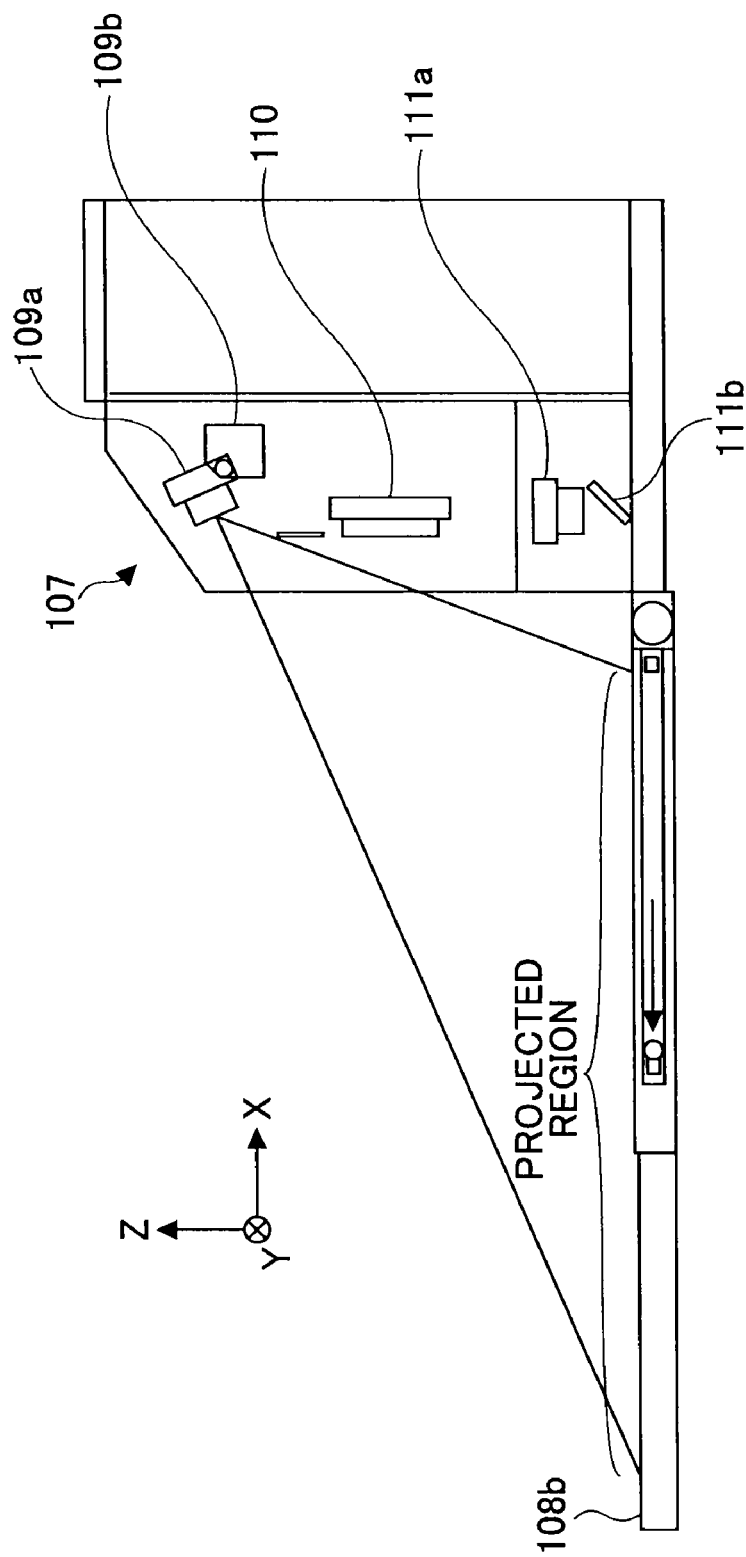
FIG. 9A is a side view of the input unit illustrating the projected region when the second table is drawn out.
Figure 9B:
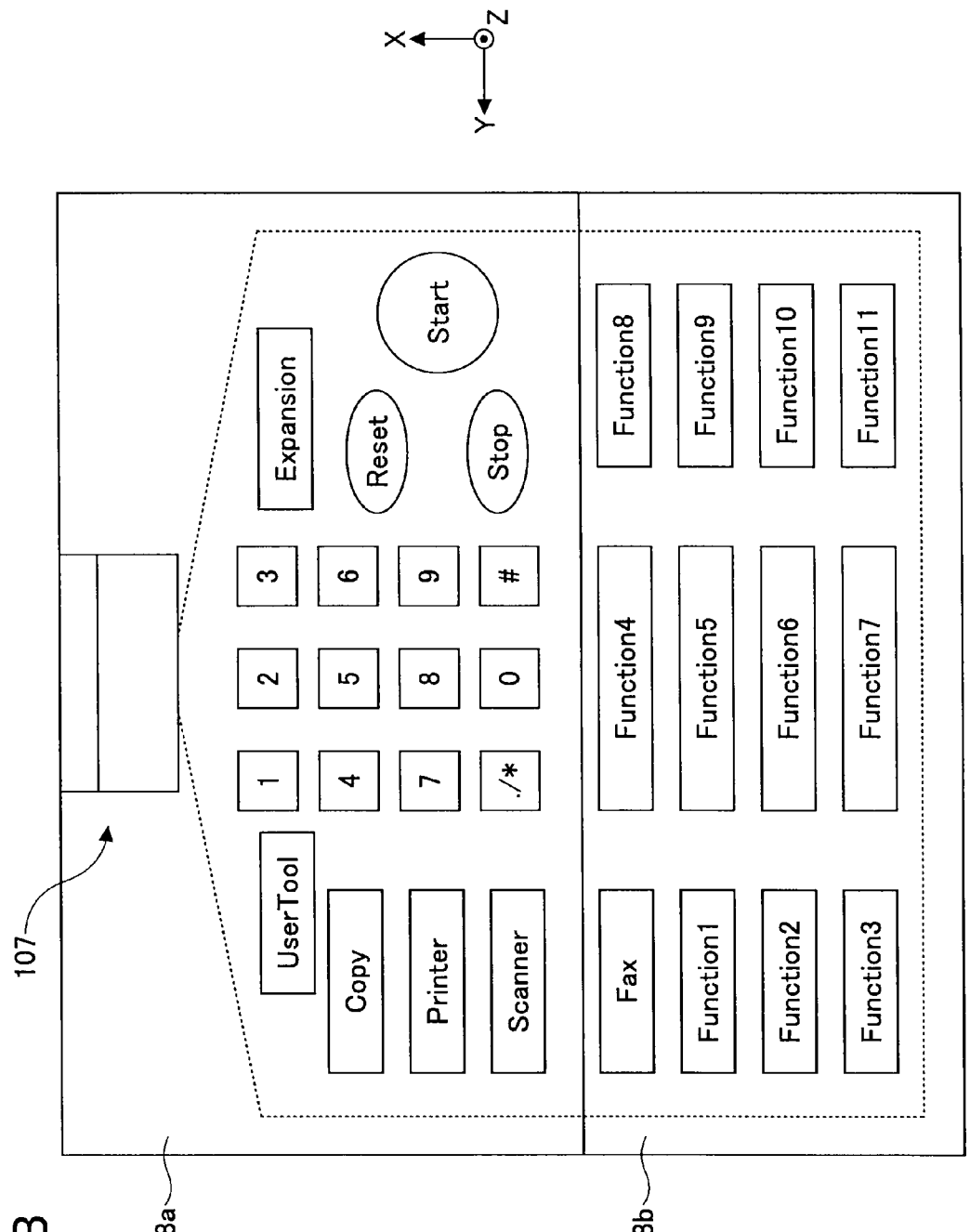
FIG. 9B shows a virtual key image projected in the projecting region shown in FIG. 9A.

FIG. 8A shows the projected region when the second table 108b is housed within the first table 108a. FIG. 8B shows an example of the virtual key image projected in the projected region of FIG. 8A. FIG. 9A shows the projected region when the second table 108b is drawn out of the first table 108a. FIG. 9B shows an example of the virtual key image projected in the projected region shown in FIG. 9A.

The individual virtual keys in the virtual key images shown in FIGS. 8B and 9B are similar in meaning to the input keys in a conventional multifunction peripheral apparatus. For example, the "Copy" key is a virtual key for instructing an operation of the multifunction peripheral as a copy machine. The "Scanner" key is a virtual key for instructing an operation as a scanner. The "Printer" key is a virtual key for instructing an operation as a printer. The "Fax" key is a virtual key for instructing an operation as a facsimile machine.

The "Reset" key is a virtual key for cancelling the previously entered contents. The "Start" key is a virtual key for instructing the start of an operation. The "Stop" key is a virtual key for instructing the ceasing of an operation. The "0" through "9" keys, the "./*" key, and the "#" key are virtual keys corresponding to the so-called numeric keypad. The "UserTool" key is a virtual key for entering into a mode for viewing the initial settings of the multifunction peripheral 100 or a counter value. The "Expansion" key is a virtual key for changing the size of the table. The "Function1" through "Function11" keys are virtual keys for opening a document box (for storage of documents), login or logout, and various other functions.

Figure 10A:
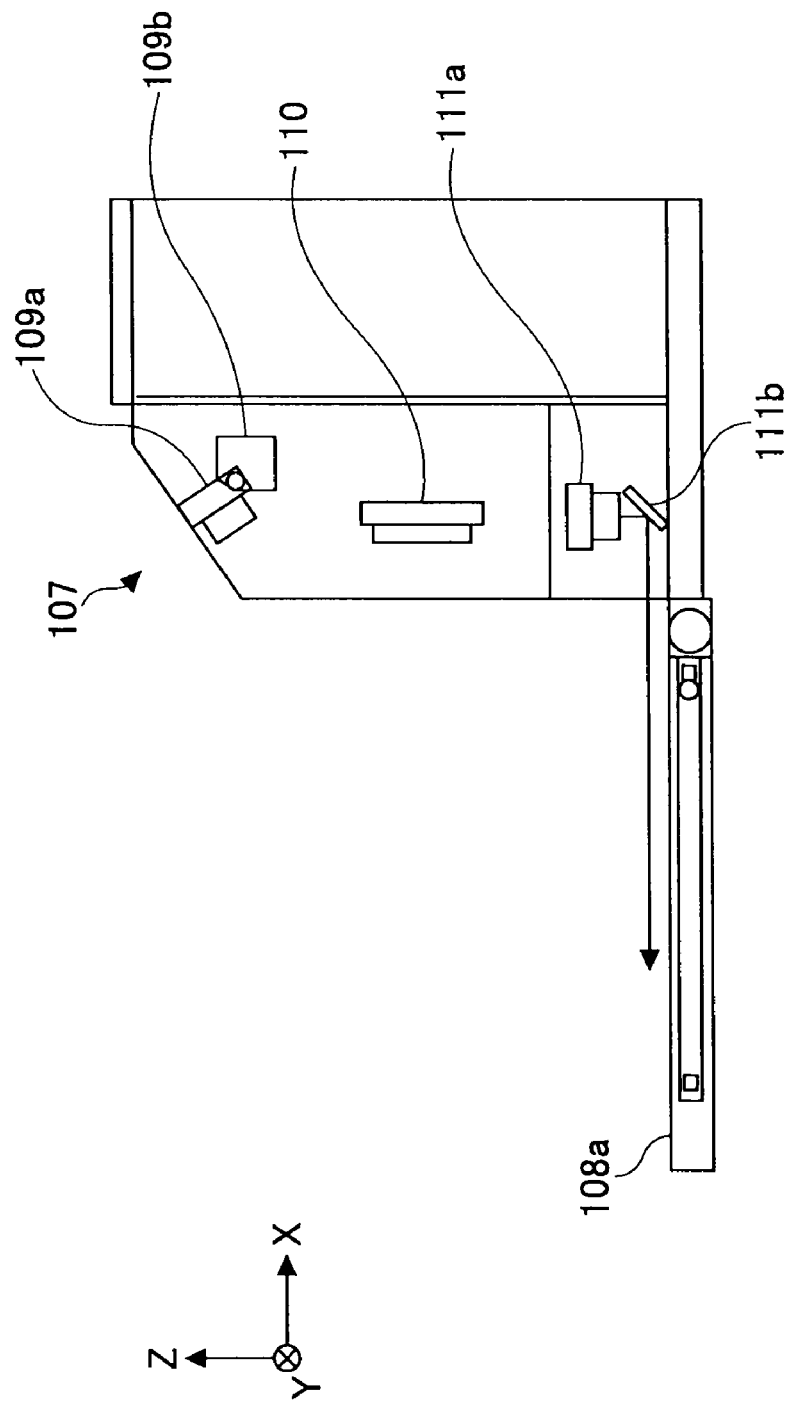
FIG. 10A is a side view of the input unit, illustrating an operation of an infrared device.
Figure 10B:
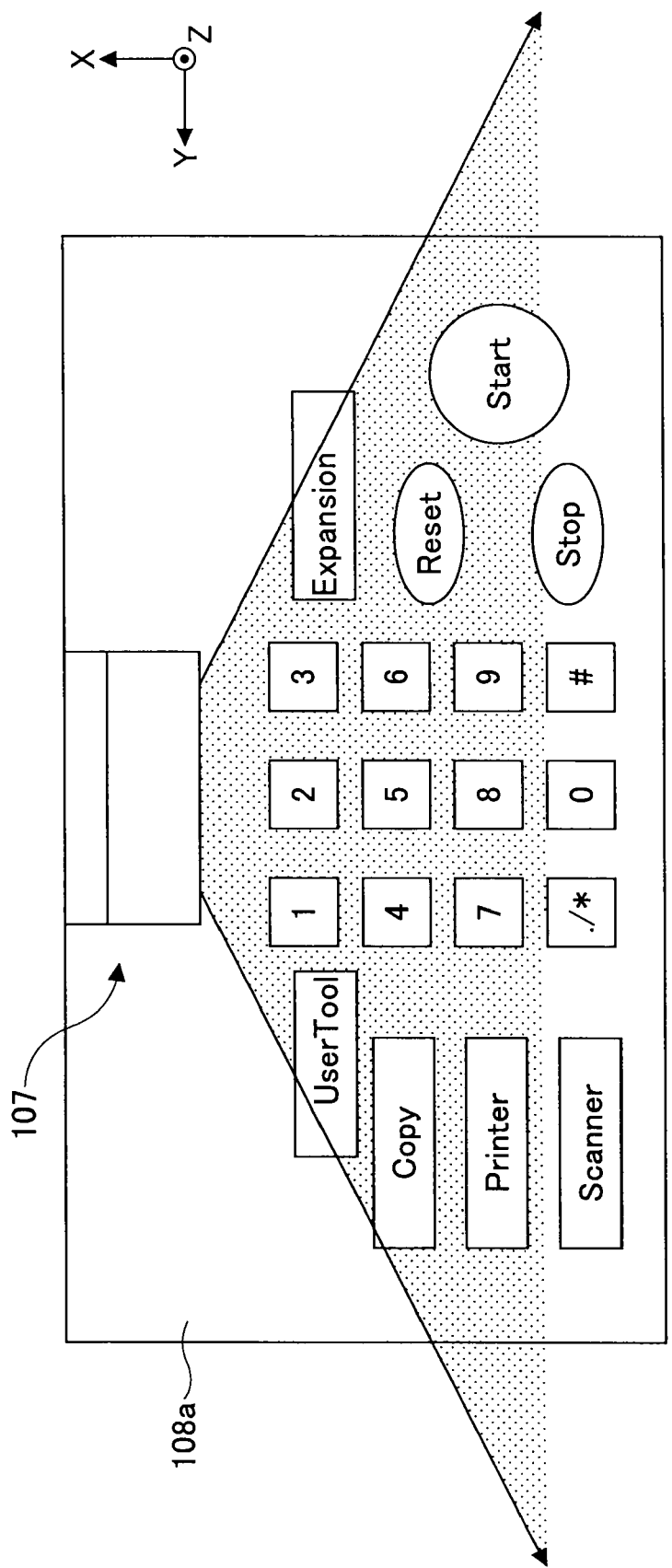
FIG. 10B shows how the projected region is covered by infrared light emitted by the infrared device.

Referring to FIGS. 6 and 10A, the infrared device 111 is disposed on the −Z end of the casing of the input unit 107. The infrared device 111 includes a light source 111a for emitting infrared light, and a reflecting mirror 111b for bending the optical path of the infrared light from the light source 111a. As shown in FIG. 10A, the infrared light, after being emitted by the light source 111a in the −Z direction, has its optical path bent by the reflecting mirror 111b in the −X direction. Because the infrared light emitted by the light source 111a is diverging light, the infrared light propagates in a space close to the surface of the table while diverging in directions parallel to the table surface. The infrared light from the input unit 107 may cover most of the projected region as seen from the Z axis direction, as shown in FIG. 10B.

Figure 11:
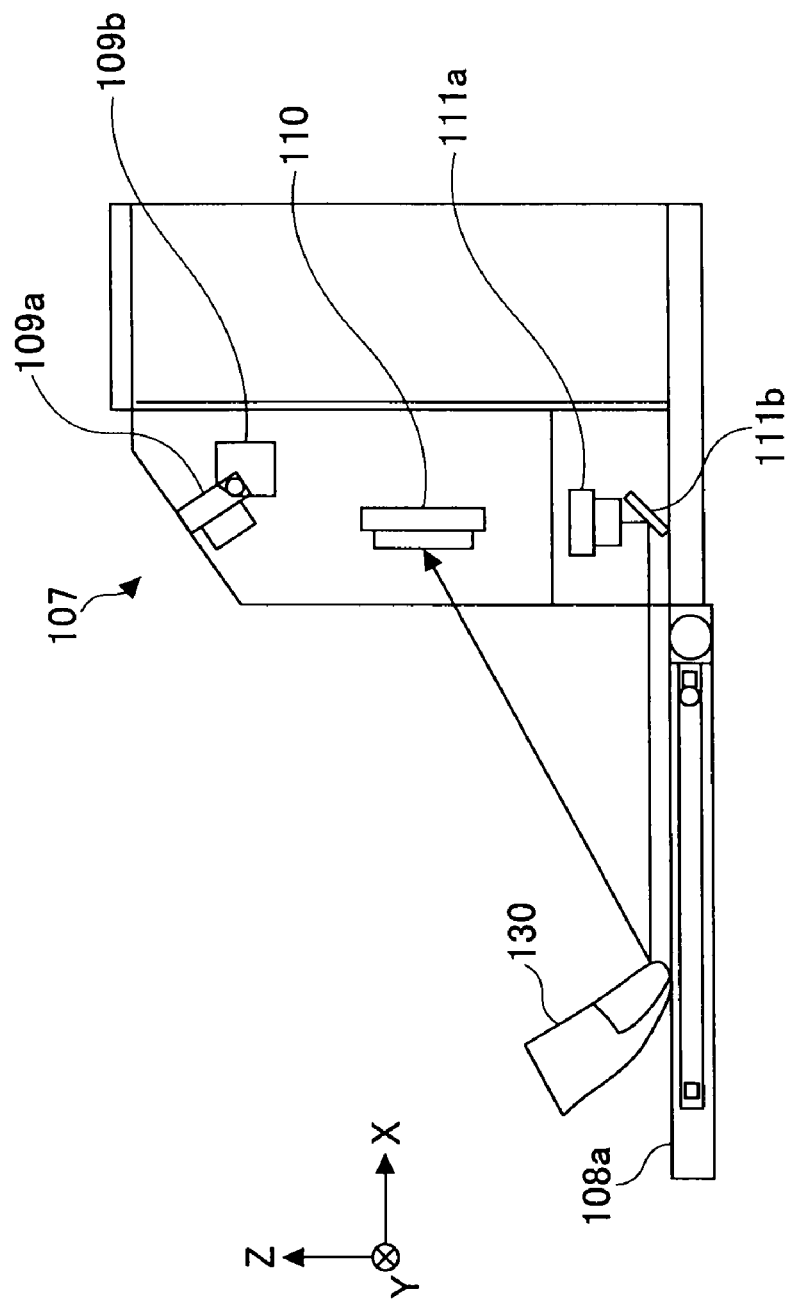
FIG. 11 is a side view illustrating an operation of a CMOS camera in the input unit of the multifunction peripheral.

With reference to FIG. 11, the CMOS camera 110 is disposed between the projector unit 109 and the infrared device 111 within the casing of the input unit 107. The CMOS camera 110 is positioned such that, when a finger 130 of the user is placed on the table as shown in FIG. 11, the infrared light reflected by the finger 130 becomes incident on the CMOS camera 110. Upon incidence of the infrared light, the CMOS camera 110 outputs a signal including information about the position of the finger 130. The output signal from the CMOS camera 110 is supplied to the input unit control unit 116.

The ADF/scanner unit control unit 120 include a CPU and a memory (both not shown) in which a program described in codes that the CPU 120a can decode and various data are stored. Hereafter, an operation of the ADF/scanner unit control unit 120 is described with reference to a flowchart shown in FIG. 12. The operation is performed in accordance with a process algorithm of the program executed by the CPU.

When power is turned on, a start address of the program is set in a program counter of the CPU, and the process starts.

Communications with the main body control unit 115 are conducted via interrupt processes for both transmission and reception (i.e., via a reception interrupt process and a transmission interrupt process). Upon notice from the main body control unit 115, a corresponding reception flag is set in the reception interrupt process.

Figure 12:
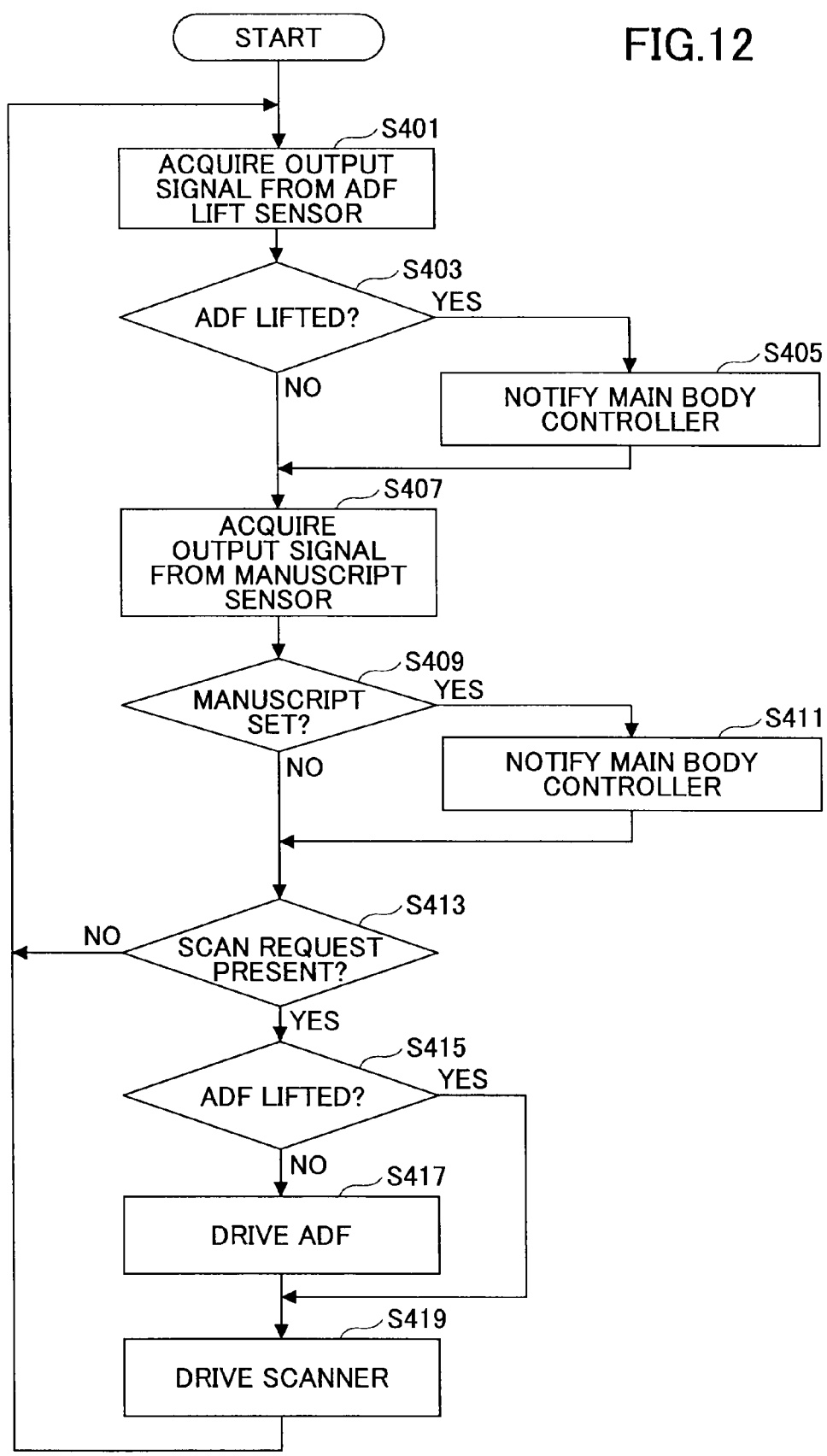
FIG. 12 shows a flowchart of an operation of an ADF/scanner unit control unit of the multifunction peripheral according to the present embodiment.
Figure 13:
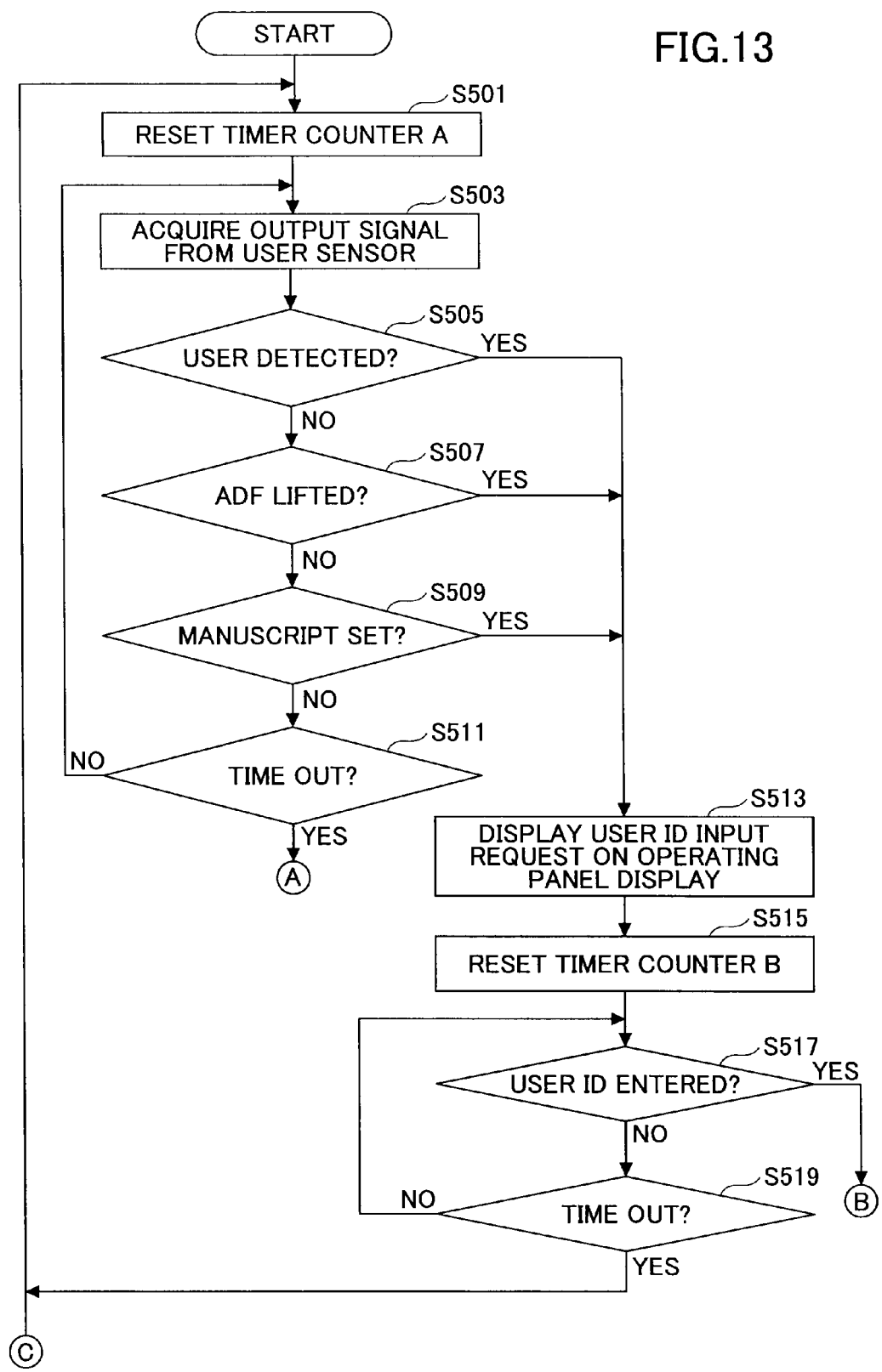
FIG. 13 shows a first half of a flowchart of an key input operation performed by a main body control unit.
Figure 14:
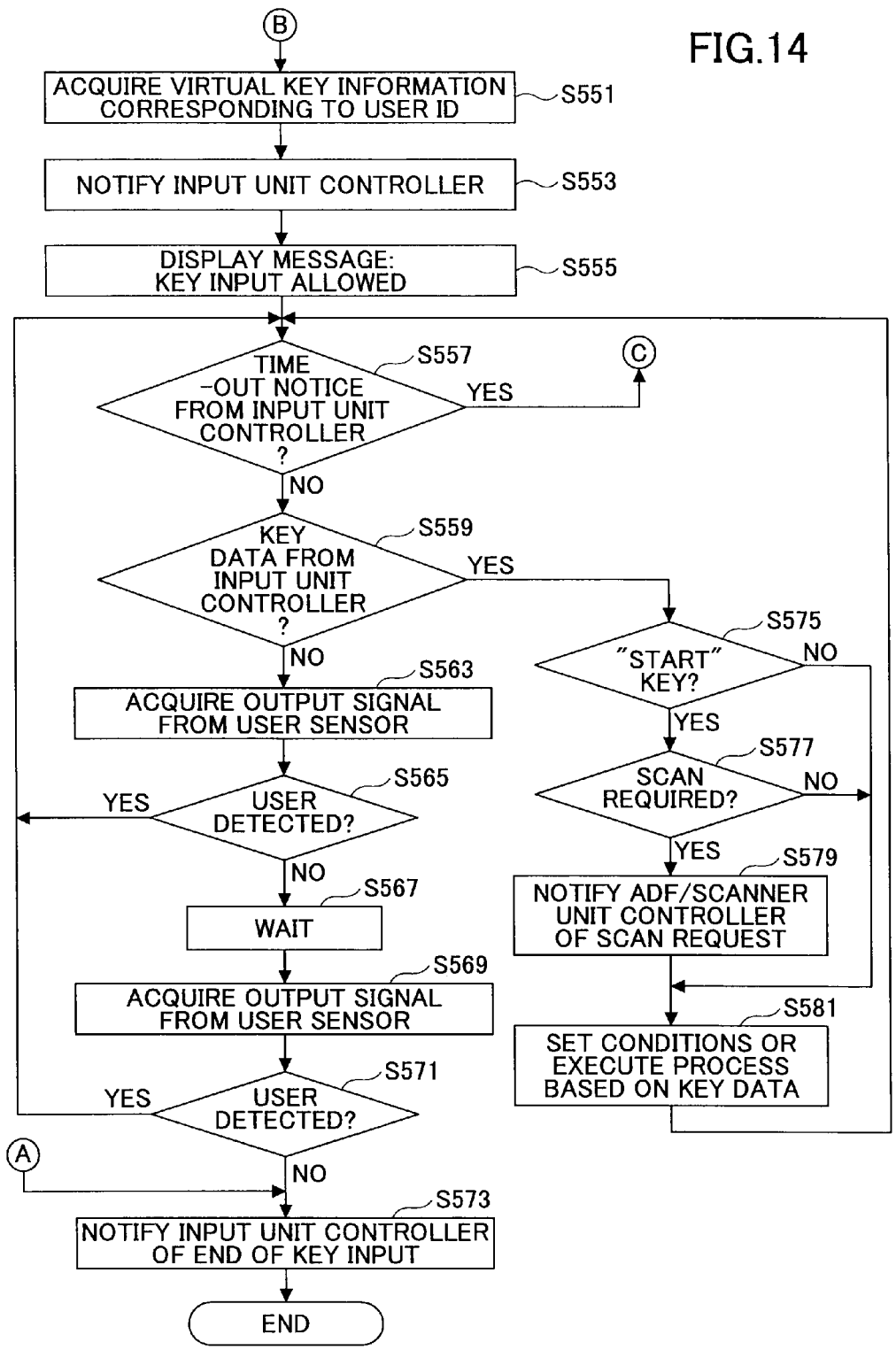
FIG. 14 shows a latter half of the flowchart of the key input operation.
Figure 15:
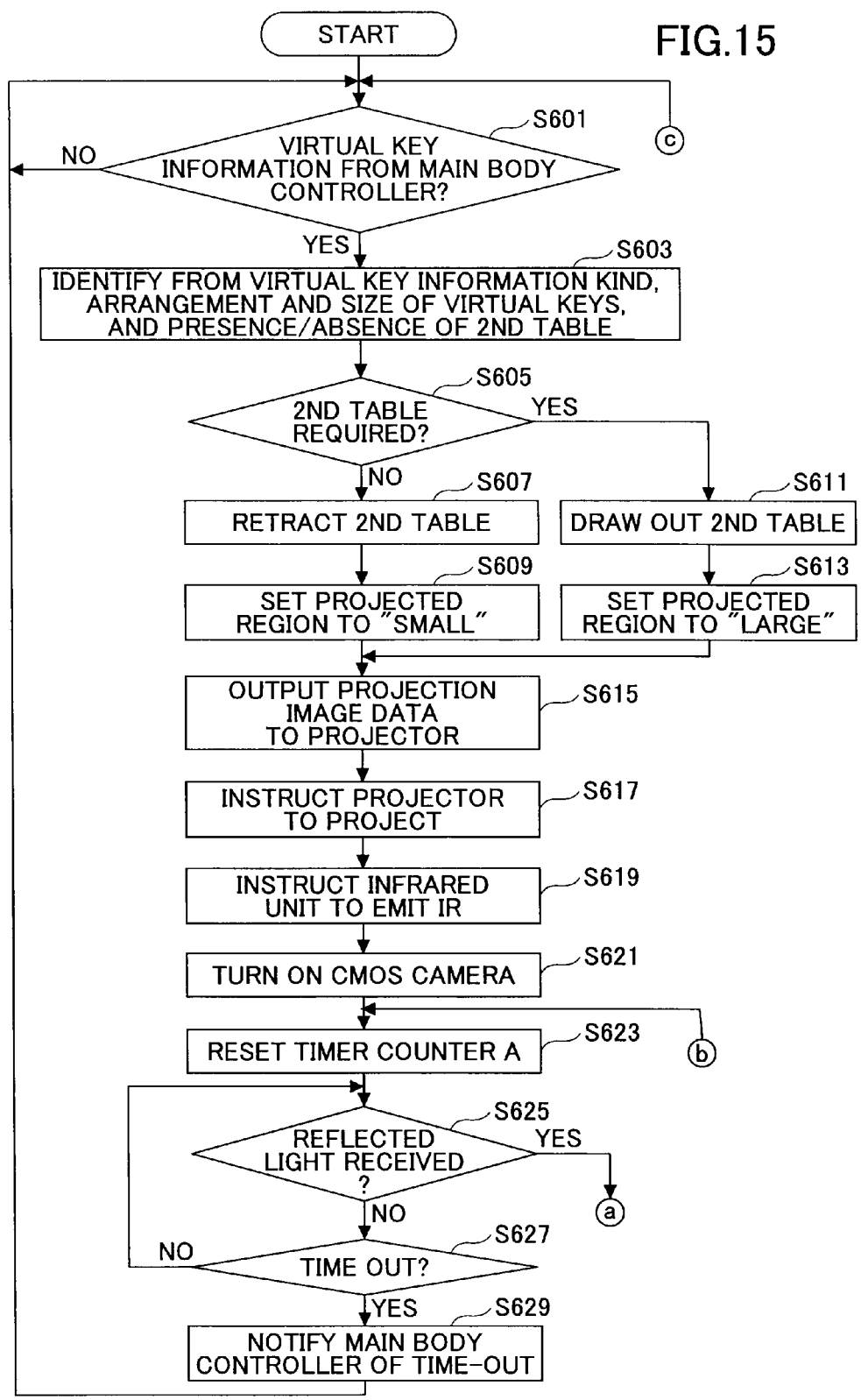
FIG. 15 shows a first half of a flowchart of an operation of the input unit control unit.
Figure 16:
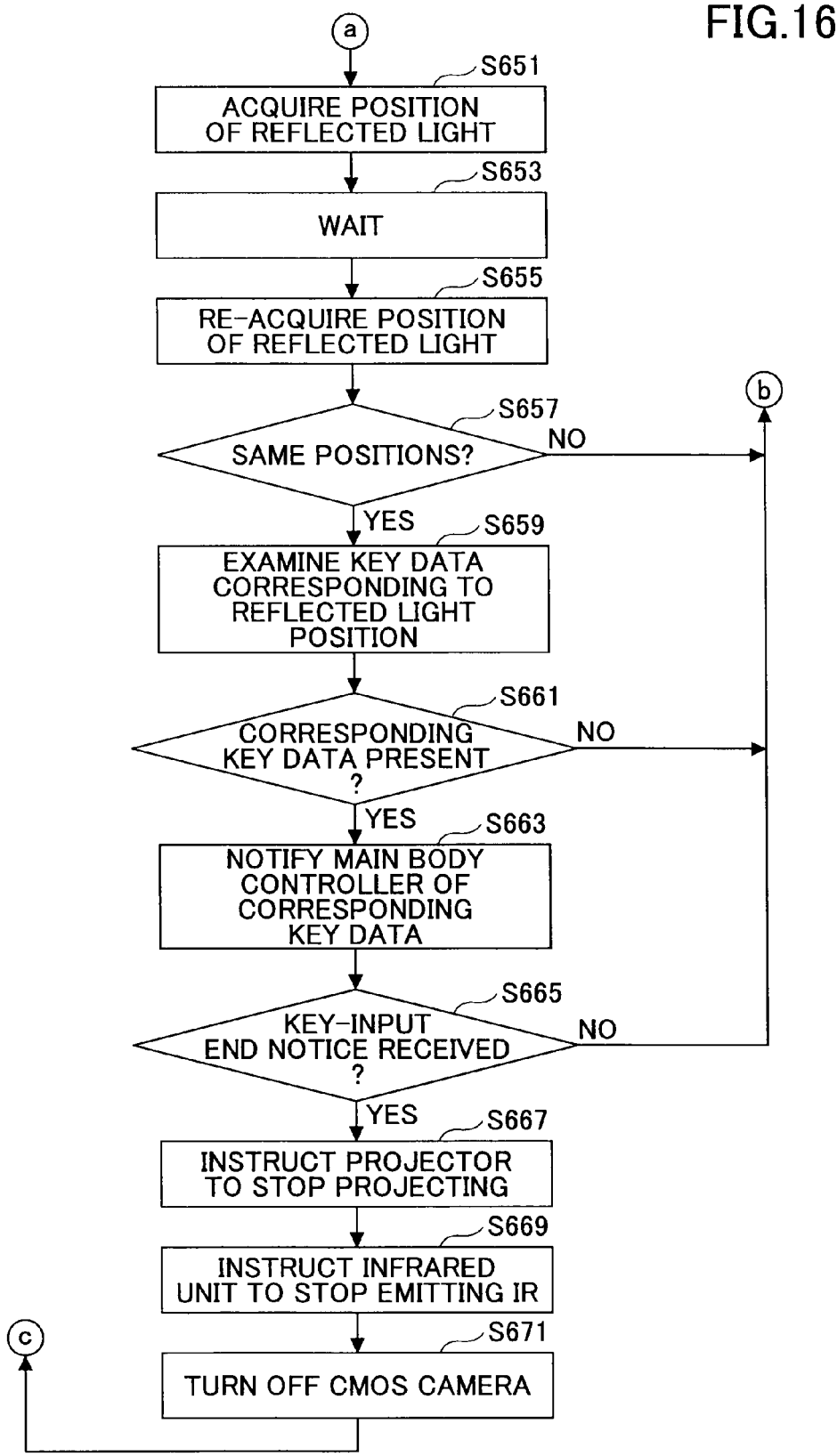
FIG. 16 shows a latter half of the flowchart of the operation of the input unit control unit.

Referring to FIG. 12, in the initial step S401, an output signal is acquired from the ADF lift sensor 121.

In step S403, based on the output signal from the ADF lift sensor 121, it is determined whether the ADF 101 is lifted by the user. If the ADF lift sensor 121 detects the lifting of the ADF 101, the process goes to step S405.

In step S405, the main body control unit 115 is notified of the lifting of the ADF 101.

In step S407, an output signal is acquired from the manuscript sensor 122.

In step S409, it is determined whether, based on the output signal from the manuscript sensor 122, a manuscript is set on the manuscript tray of the ADF 101. If the manuscript sensor 122 detects the setting of the manuscript, the process goes to step S411.

In step S411, the main body control unit 115 is notified of the setting of the manuscript.

In step S413, reference is made to the reception flag in order to determine whether a scan request has been made by the main body control unit 115. When there is a scan request from the main body control unit 115, the process goes to step S415. At the same time, the reception flag indicating the scan request from the main body control unit 115 is reset.

In step S415, it is determined whether, based on the output signal from the ADF lift sensor 121, the ADF 101 is lifted by the user. If the ADF lift sensor 121 detects no lifting of the ADF 101, the process goes to step S417.

In step S417, the ADF 101 is instructed to start operating, whereby the manuscript set on the manuscript tray is transported onto the upper surface of the scanner 103. When there are more than one sheet of manuscript, the reading of the initially transported manuscript sheet by the read scanner 103 is completed before the next manuscript sheet is transported to the scanner 103.

In step S419, the scanner 103 is instructed to start operating, whereby the image information in the manuscript placed on the upper surface is read. When all of the manuscript sheets have been read, the process returns to step S401.

In step S403, if the ADF lift sensor 121 detects no lifting of the ADF 101, the process goes to step S407. In step S409, if the manuscript sensor 122 detects no setting of the manuscript, the process goes to step S413. In step S413, if there is no scan request from the main body control unit 115, the process goes back to step S401. In step S415, if the ADF lift sensor 121 detects the lifting of the ADF 101, the process goes to step S419.

The main body control unit 115 includes a CPU and a memory (both not shown) in which a program written in codes that can be decoded by the CPU 115a and various data are stored. Hereafter, a key input operation performed by the main body control unit 115 is described with reference to a flowchart shown in FIGS. 13 and 14. The flowchart shown in FIGS. 13 and 14 corresponds to a process algorithm executed by the CPU in accordance with the program in the memory.

When power is turned on, a start address of the program is set in the program counter of the CPU, whereby an operation of the main body control unit 115 is started. When the key input operation is requested, the program corresponding to the flowchart of FIGS. 13 and 14 (which may be a subroutine or a module) is called.

Communications with the input unit control unit 116, the ADF/scanner unit control unit 120, and the ID reader 123 are conducted via interrupt processes for both transmission and reception (i.e., a reception interrupt process and a transmission interrupt process). Upon notice from either the input unit control unit 116, the ADF/scanner unit control unit 120, or the ID reader 123, a corresponding reception flag is set in the reception interrupt process.

In the initial step S501, a timer counter A is reset. The timer counter A is counted up by the timer interrupt process.

In step S503, an output signal is acquired from the user sensor 114.

In step S505, based on the output signal from the user sensor 114, it is determined whether the user sensor 114 has detected a user. If not, the process goes to step S507.

In step S507, reference is made to the reception flag to determine whether the ADF 101 is being lifted. Unless there is a notification from the ADF/scanner unit control unit 120 that the ADF 101 is lifted, the process goes to step S509.

In step S509, reference is made to the reception flag to determine whether a manuscript is set in the manuscript tray of the ADF 101. Unless there is a notification from the ADF/scanner unit control unit 120 that a manuscript is set, the process goes to step S511.

In step S511, reference is made to the timer counter A to determine whether a time-out duration has run out. If the value of the timer counter A is below a predetermined value, the process goes back to step S503.

On the other hand, if in step S505 the user sensor 114 indicates a detection, the process goes to step S513.

In step S507, if there is the notification from the ADF/scanner unit control unit 120 that the ADF 101 is lifted, the process goes to step S513. At the same time, the reception flag indicating the lifting of the ADF 101 is reset.

In step S509, if there is the notification from the ADF/scanner unit control unit 120 that the manuscript is set, the process goes to step S513. At the same time, the reception flag indicating the setting of the manuscript is reset.

In step S513, a message requesting the input of a user ID is displayed on the operating panel display unit 102.

In step S515, a timer counter B is reset. The timer counter B is counted up by the timer interrupt process.

In step S517, reference is made to the reception flag to determine whether the user ID has been entered. If there is no notice of the user ID from the ID reader 123, the process goes to step S519.

In step S519, reference is made to the timer counter B to determine whether the time-out duration has run out. If the value of the timer counter B is below a predetermined value, the process goes back to step S517. If the value of the timer counter B exceeds the predetermined value, the process goes back to step S501.

In step S517, if there is the notification from the ID reader 123 about the user ID, the process goes to step S551. The reception flag indicating the notification of the user ID is also reset.

In step S551, reference is made to the user information stored in the memory 124, and the virtual key information corresponding to the indicated user ID is acquired. The virtual key information may include a virtual key number that specifies the kind and arrangement of the virtual keys and the size of each of the keys, and the presence or absence of the second table 108b.

In step S553, the input unit control unit 116 is notified of the virtual key information acquired.

In step S555, a message is displayed on the operating panel display unit 102 indicating that a key input can be made.

In step S557, it is determined whether a notification is received from the input unit control unit 116 indicating the running out of the time-out duration. If not, the process goes to step S559.

In step S559, it is determined whether there is a notification of key data from the input unit control unit 116. If not, the process goes to step S563.

In step S563, an output signal from the user sensor 114 is acquired.

In step S565, it is determined whether, based on the output signal from the user sensor 114, the user sensor 114 has detected a user. If not, the process goes to step S567.

In step S567, the process waits for a predetermined time.

In step S569, an output signal from the user sensor 114 is again acquired.

In step S571, based on the output signal from the user sensor 114, it is determined whether the user sensor 114 has detected a user. If not, the process goes to step S573.

In step S573, it is determined that the key input operation should be terminated, and the input unit control unit 116 is notified of the end of key input. This completes the key input operation, and the system may transition to another process or operation.

In step S511, if the value of the timer counter A exceeds the predetermined value, the process goes to step S573.

In step S557, if there is the notification from the input unit control unit 116 about the time-out, the process goes back to step S501. The reception flag indicating the time-out notification is also reset.

In step S565, if the user sensor 114 indicates the detection of a user, the process goes back to step S557.

Similarly, in step S571, if the user sensor 114 indicates the detection of a user, the process goes back to step S557.

In step S559, if there is the notification of key data from the input unit control unit 116, the process goes to step S575. The reception flag indicating the key data notification is also reset.

In step S575, it is determined whether the key data indicates the "Start" key. If the key data corresponds to the "Start" key, the process goes to step S577.

In step S577, it is determined whether a manuscript needs to be scanned. For example, when the multifunction peripheral 100 is set to operate as a copy machine or a scanner, the process goes to step S579.

In step S579, a scan request is sent to the ADF/scanner unit control unit 120.

In step S581, a condition setting process or any other process in accordance with the key data is performed. The process then goes back to step S557.

In step S575, if the key data does not correspond to the "Start" key, the process goes to step S581. In step S581, when the key data corresponds to the "Copy" key, the multifunction peripheral 100 is set to operate as a copy machine. When the key data corresponds to the "Scanner" key, the multifunction peripheral 100 is set to operate as a scanner. When the key data corresponds to the "Printer" key, the multifunction peripheral 100 is set to operate as a printer.

In step S577, when the multifunction peripheral 100 is set to operate as a printer, for example, the process goes to step S581.

The input unit control unit 116 includes a CPU and a memory (both not shown) in which a program written in codes that can be decoded by the CPU and various data are stored. Hereafter, an operation of the input unit control unit 116 is described with reference to a flowchart shown in FIGS. 15 and 16. The flowchart of FIGS. 15 and 16 corresponds to a process algorithm executed by the CPU of the input unit control unit 116 in accordance with the program in the memory.

When power is turned on, a start address of the program is set in a program counter of the CPU, whereby the process is started.

In the present example, communications with the main body control unit 115 are conducted via interrupt processes for both transmission and reception (i.e., a reception interrupt process and a transmission interrupt process). Upon notification from the main body control unit 115, a corresponding reception flag is set in the reception interrupt process.

In the initial step S601, reference is made to the reception flag to determine whether there is a notification from the main body control unit 115 concerning virtual key information. If there is the virtual key information notification from the main body control unit 115, the process goes to step S603. The reception flag indicating the notification of virtual key information is also reset.

In step S603, various information is identified based on the virtual key information, such as the kind and arrangement of the virtual keys, the size of each virtual key, and the presence or absence of the second table 108b. In the present example, the memory stores projection data for each virtual key number in advance, the data including the kind and arrangement of the virtual keys, the size of each virtual key, and the presence or absence of the second table 108b. Thus, the virtual key number enables the retrieval and extraction of relevant projection data.

In step S605, based on the acquired projection data, it is determined whether the second table 108b in the projection table unit 108 is required. If not, the process goes to step S607.

Figure 17:
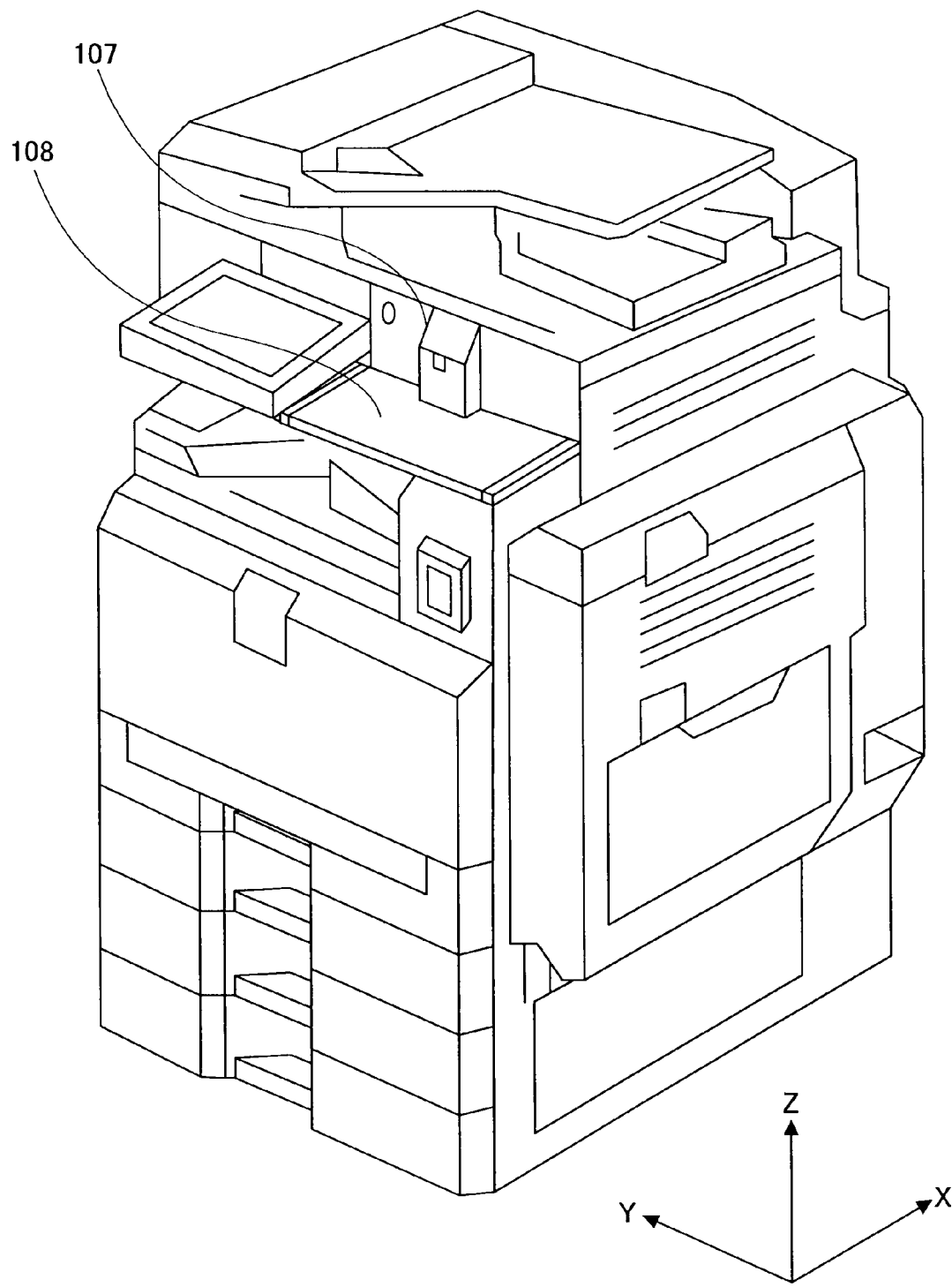
FIG. 17 is a perspective view of the multifunction peripheral according to the present embodiment, illustrating the second table being retracted in the first table.

In step S607, the table drive unit 129 is instructed to retract the second table 108b into the first table 108a (see FIG. 17). The second table 108b may be moved in the +X direction until the protrusion 126 of the second table 108b contacts the protrusion sensor 128b. When the second table 108b is already retracted in the first table 108a, no operation is performed.

In step S609, the projection drive mechanism 109b is instructed to set the size of the projected region on the table to "Small".

In step S615, based on the projection data, projection image data is outputted to the projector unit 109.

Figure 18:
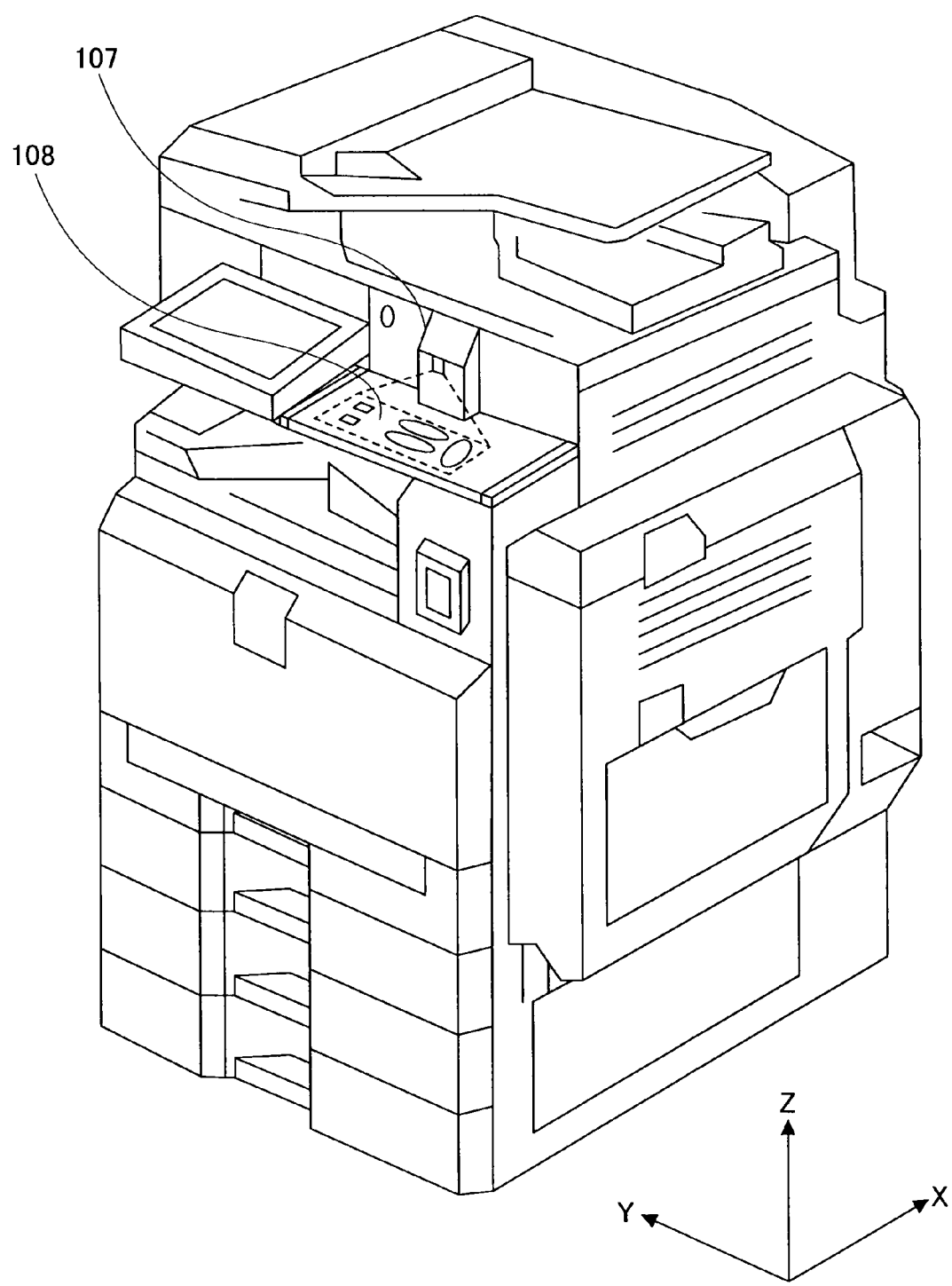
FIG. 18 is a perspective view of the multifunction peripheral, illustrating a virtual key image projected on the first table.

In step S617, the projector unit 109 is instructed to perform projection. Thus, a virtual key image is projected on the first table 108a as shown in FIG. 18.

In step S619, the infrared device 111 is instructed to emit infrared light.

In step S621, the CMOS camera 110 is turned on, and the key finalizing flag is reset.

In step S623, a timer counter A is reset. The timer counter A is counted up by the timer interrupt process.

In step S625, based on the output signal from the CMOS camera 110, it is determined whether the CMOS camera 110 has received reflected light of the infrared light. If the CMOS camera 110 has received the reflected light of the infrared light, the process goes to step S627.

In step S627, reference is made to the timer counter A to determine whether the time-out duration has run out. If the value of the timer counter A is below a predetermined value, the process returns to step S625. On the other hand, if the value of the timer counter A exceeds the predetermined value, the process goes to step S629.

In step S629, the main body control unit 115 is notified of the running out of the time-out duration. Then, the process returns to step S601.

In step S601, if there is no notification from the main body control unit 115 concerning the virtual key information, the process waits until the notification about the virtual key information is received from the main body control unit 115.

In step S605, if the second table 108b is required, the process goes to step S611.

Figure 19:
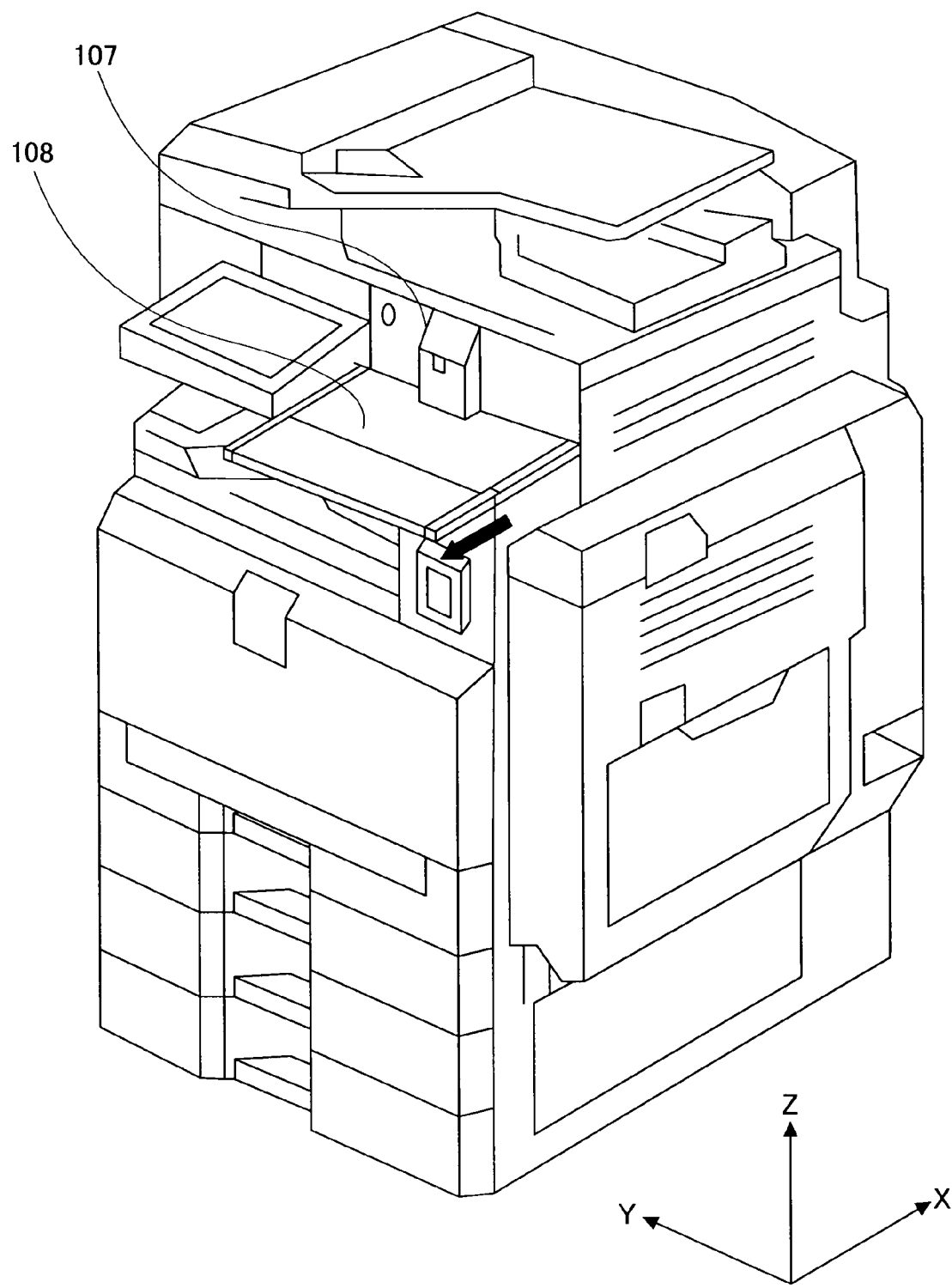
FIG. 19 is a perspective view of the multifunction peripheral, illustrating the second table being drawn out of the first table.

In step S611, the table drive unit 129 is instructed to draw out the second table 108b from the first table 108a (see FIG. 19). In the present example, the second table 108b is moved in the −X direction until the protrusion 126 of the second table 108b contacts the protrusion sensor 128a. When the second table 108b is already drawn out of the first table 108a, no operation is performed.

Figure 20:
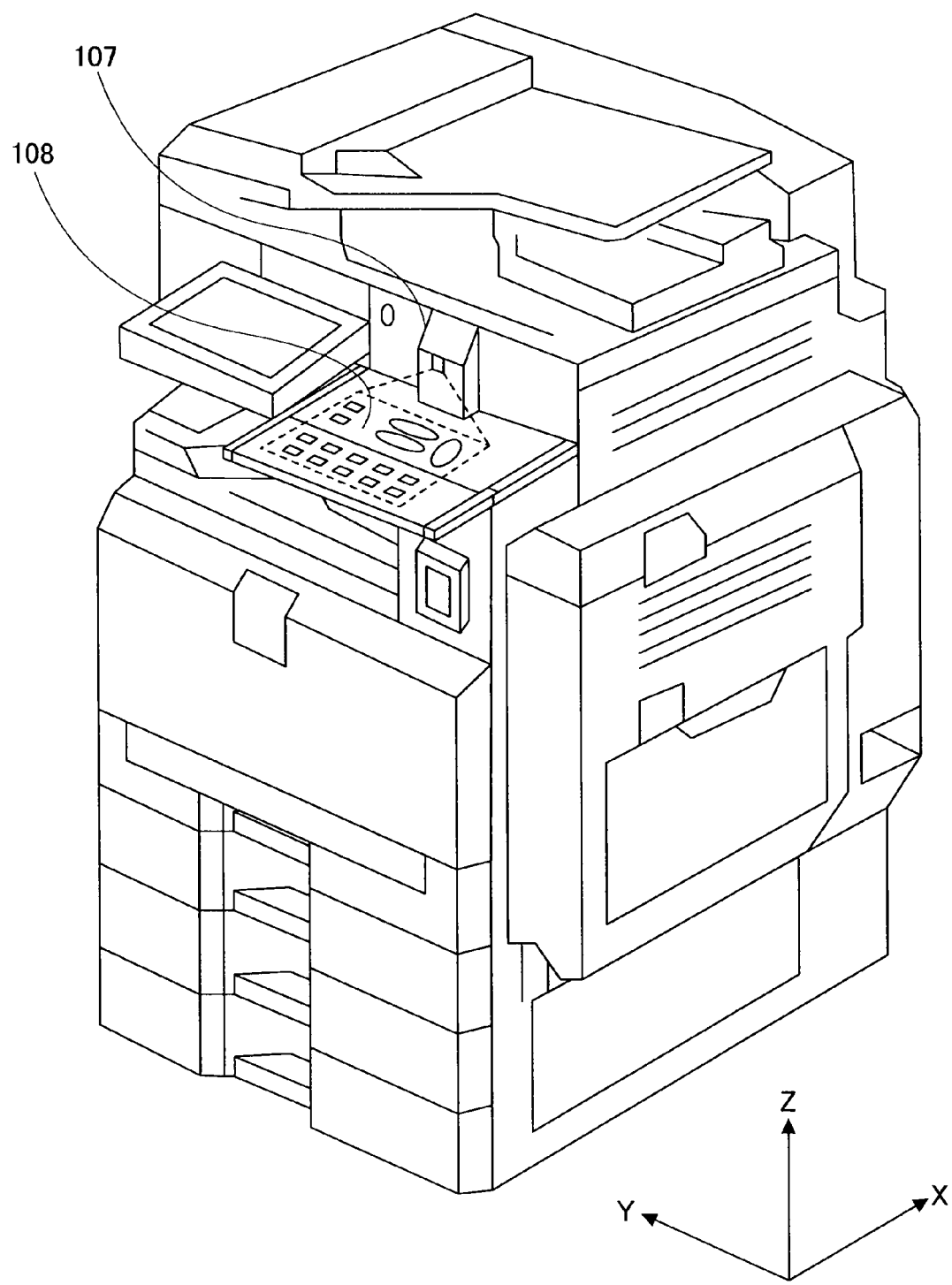
FIG. 20 is a perspective view of the multifunction peripheral, illustrating a virtual key image being projected on the first and the second tables.

In step S613, the projection drive mechanism 109b is instructed to set the size of the projected region on the table to "Large". Then, the process goes to step S615. At this time, a virtual key image is projected on the first table 108a and the second table 108b in step S617, as shown in FIG. 20, for example.

In step S625, if the CMOS camera 110 receives the reflected light of infrared light, the process goes to step S651.

In step S651, based on the output signal from the CMOS camera 110, a position at which the reflected light is received on the CMOS camera 110 is determined.

In step S653, the process waits for a predetermined time.

In step S655, based on the output signal from the CMOS camera 110, the position at which the reflected light is received on the CMOS camera 110 is again determined.

In step S657, it is determined whether the reflected light reception position determined in step S651 is the same as the reflected light reception position determined in step S655. If the reception positions are the same, the process goes to step S659. The reception positions may be considered the same if the difference between them is within a predetermined range.

In step S659, reference is made to the projection data, and key data corresponding to the reflected light reception position is searched for.

The relationship between the various reflected light reception positions on the CMOS camera 110 and the corresponding positions of the finger on the table is acquired in advance through various preliminary experiments. Information concerning the relationship is stored in the memory of the input control unit. Thus, the position of the finger on the table can be known from the reflected light reception position on the CMOS camera 110. Further, the kind of the virtual key projected at the position of the finger can be known from the position of the finger on the table and the projection data.

In step S661, it is determined whether there is key data corresponding to the reception position of the reflected light. If there is the corresponding key data, the process goes to step S663.

In step S663, if the key finalizing flag is in a reset status, the main body control unit 115 is notified of the key data corresponding to the reception position of the reflected light, and the key finalizing flag is set.

In step S665, reference is made to the reception flag to determine whether there is a notification from the main body control unit 115 indicating the end of key input. If not, the process returns to step S623.

In step S657, if the respective reception positions are different, the process returns to step S623, and the key finalizing flag is reset.

In step S661, if there is no key data corresponding to the reception position of the reflected light, the process returns to step S623, and the key finalizing flag is reset.

In step S665, if there is the notification indicating the end of key input, the process proceeds to step S667. The reception flag indicating the notification of the end of key input is also reset.

In step S667, the projector unit 109 is instructed to stop projecting.

In step S669, the infrared device 111 is instructed to stop emitting infrared light.

In step S671, the CMOS camera 110 is turned off, and the process returns to step S601.

Thus, in accordance with the multifunction peripheral 100 of the present embodiment, the input apparatus includes the projection table unit 108, the input unit 107, and the ID reader 123. The position detecting device includes the infrared device 111, the CMOS camera 110, and the input unit control unit 116. The key detecting device includes the input unit control unit 116. The user information input unit includes the ID reader 123.

As described above, the multifunction peripheral 100 according to the present embodiment includes the projection table unit 108 having a table whose size can be changed; the projector unit 109 for projecting an image of plural virtual keys on the table, the keys corresponding to the size of the table; the infrared device 111 for emitting infrared light near a region on the table where the image of the plural virtual keys is projected; the CMOS camera 110 on which infrared light reflected by the finger of a user placed on the table is incident and that outputs a signal including position information about the finger of the user on the table; and the input unit control unit 116 for detecting one of the plural virtual keys that corresponds to the position of the user's finger, based on the information about the image of the plural virtual keys and the output signal from the CMOS camera 110.

In accordance with the present embodiment, the user can input an instruction to the multifunction peripheral main body non-mechanically, so that the durability of the input apparatus or the multifunction peripheral can be improved. Further, because the size of the table can be changed as needed, enhanced operability can be obtained.

In accordance with the foregoing embodiment, the key input operation is started by the main body control unit 115 when the user either stands in front of the multifunction peripheral 100, sets a manuscript, or performs a preliminary operation (preparatory operation) for the setting of the manuscript, for example. Thus, the input unit 107 can activate the projector unit 109, the CMOS camera 110, or the infrared device 111 only when necessary, thereby contributing to the saving of energy.

In the foregoing embodiment, because the plural virtual keys corresponding to the user ID are projected, further enhanced operability can be obtained.

In an embodiment of the present invention, at least part of the process performed by the input unit control unit 116 may be implemented by hardware. At least part of the key input operation performed by the main body control unit 115 may be performed by the input unit control unit 116. For example, the process of acquiring the virtual key information corresponding to the user ID may be performed by the input unit control unit 116.

At least part of the key input operation performed by the main body control unit 115 may be performed by hardware. At least part of the process performed by the ADF/scanner unit control unit 120 may be performed by the main body control unit 115 or other hardware.

While in the foregoing the second table 108b is described as being drawing in and out mechanically by the table drive unit 129, the second table 108b may be drawn in or out by the user manually. The size of the table is not limited to the two sizes described above, and there may be three or more sizes of the table so that the second table 108b can be drawn in or out in multiple steps.

While the virtual key information is described above as being different from one user to another, the present invention is not limited to such embodiment. In another embodiment, the virtual key information may be varied depending on the size of the table. In this case, after the second table 108b is drawn in or out manually, the virtual key information may be acquired in accordance with the position of the second table 108b (in the X axis direction).

While the user ID is entered using the ID reader 123 in the foregoing embodiment, the present invention is not limited to such an embodiment. In another embodiment, information identifying virtual key information may be entered using the ID reader 123. For example, the virtual key number may be entered using the ID reader 123.

The user ID may be entered in other ways than using the ID reader 123. For example, the user ID may be entered via a higher-level apparatus (such as a personal computer).

In the foregoing description, the main body control unit 115 has been described as transitioning to a next operation (i.e., in step S513 in the present embodiment) upon detection of any of the events of detection of a user, the lifting of the ADF, or the setting of a manuscript during the key input operation. However, the present invention is not limited to such an embodiment. In another embodiment, the main body control unit 115 may transition to the next operation upon detection of a combination of the presence of the user and either the lifting of the ADF or the setting of the manuscript.

While the size of the projected region has been described as being changed using the projection drive mechanism 109b, the present invention is not limited to such an embodiment. In another embodiment, instead of the projection drive mechanism 109b, an aperture mechanism 109a6 may be used that has plural apertures with different opening sizes. Then, an appropriate aperture corresponding to the size of the projected region can be disposed on the optical path (such as after the projection lens 109a5). In another embodiment, the liquid crystal panel 109a4 may be provided with an aperture function by incorporating mask data corresponding to the size of the projected region into the projection image data.

The kind, arrangement, and size of the virtual keys projected on the table in the foregoing embodiment are merely examples and the present invention is not limited to such an embodiment. The color of the virtual keys may be varied depending on the kind of the key. In this case, a color liquid crystal panel may be used instead of the liquid crystal panel 109a4.

While the foregoing embodiment has been described with reference to a multifunction peripheral as an example of image forming apparatus, the present invention is not limited to the multifunction peripheral. For example, the image forming apparatus may be a copy machine, or any other image forming apparatus configured to form an image based on an instruction entered by the user.

Thus, the input apparatus according to an embodiment of the present invention can be suitably used by a user for entering an instruction into an apparatus main body. The image forming apparatus according to an embodiment of the present invention can be suitably used for forming an image based on an instruction entered by the user.

Although this invention has been described in detail with reference to certain embodiments, variations and modifications exist within the scope and spirit of the invention as described and defined in the following claims.

The present application is based on the Japanese Priority Application No. 2008-158739 filed Jun. 18, 2008, the entire contents of which are hereby incorporated by reference.

What is claimed is:

1. An input apparatus for enabling a user to enter an instruction into a main apparatus, the input apparatus comprising:
   a table device connected to a front side of the main apparatus having a table configured to expand and contract in a horizontal direction and being operable in both an expanded and a contracted state;
   a projector unit configured to project an image of plural virtual keys that is adapted to the size of the table onto the table;
   a position detecting device configured to contactlessly detect position information about a finger of the user that is placed on the table; and
   a key detecting device configured to detect one of the plural virtual keys that corresponds to the position of the finger of the user detected by the position detecting device, based on information about the image of the plural virtual keys and a result of the detection made by the position detecting device,
   wherein a size of the table is changed in accordance with information identifying the user.

2. The input apparatus according to claim 1, wherein the position detecting device includes:
   an infrared device configured to emit infrared light that diverges in a plane above the table of the table device and including a virtual plane parallel to the table; and
   a camera on which the infrared light reflected by the finger of the user placed on the table is incident, the camera being configured to output a signal including information about the position of the finger of the user on the table.

3. The input apparatus according to claim 1, wherein the key detecting device is configured to acquire information about the image of the plural virtual keys based on the size of the table.

4. The input apparatus according to claim 1, wherein the table device is configured to change the size of the table in accordance with information identifying the user.

5. The input apparatus according to claim 4, wherein the projector unit is configured to project the image of the plural virtual keys in accordance with the information identifying the user.

6. The input apparatus according to claim 4, wherein the key detecting device is configured to acquire information about the image of the plural virtual keys from the information identifying the user.

7. The input apparatus according to claim 4, including a user information input unit configured to input the information identifying the user.

8. The input apparatus according to claim 1, wherein the projector unit is configured to change the size of a projected region on the table depending on the size of the table.

9. The input apparatus according to claim 8, wherein the projector unit includes a drive mechanism for changing the size of the projected region.

10. The input apparatus according to claim 8, wherein the projector unit includes an aperture mechanism that includes plural apertures with different opening sizes and that disposes one of the apertures corresponding to the size of the projected region on an optical path.

11. An image forming apparatus for forming an image based on an instruction entered by a user, comprising:
    an input apparatus for enabling the user to enter the instruction; and
    a main apparatus for forming the image in accordance with the instruction entered by the user via the input apparatus,
    wherein the input apparatus includes:
       a table device connected to a front side of the main apparatus having a table configured to expand and contract in a horizontal direction and being operable in both an expanded and a contracted state;
       a projector unit configured to project an image of plural virtual keys that is adapted to the size of the table onto the table;
       a position detecting device configured to contactlessly detect position information about a finger of the user that is placed on the table; and
       a key detecting device configured to detect one of the plural virtual keys that corresponds to the position of the finger of the user detected by the position detecting device, based on information about the image of the plural virtual keys and a result of the detection made by the position detecting device,
          wherein a size of the table is changed in accordance with information identifying the user.

12. The image forming apparatus according to claim 11, further comprising a user sensor provided adjacent to the position detecting device and configured to detect the presence or absence of the user near the input apparatus, wherein the input apparatus is activated upon detection of the user by the user sensor.

13. An input method for enabling a user to enter an instruction into a main apparatus, the input method comprising:
    expanding and contracting a table in a horizontal direction, the table being operable in both an expanded and a contracted state;
    projecting an image of plural virtual keys that is adapted to the size of the table onto the table;
    contactlessly detecting position information about a finger of the user that is placed on the table;
    detecting one of the plural virtual keys that corresponds to the position of the finger of the user, based on information about the image of the plural virtual keys and a result of the detection of the position information about the finger of the user placed on the table;
    changing the size of the table in accordance with information identifying the user.

14. The input method according to claim 13, further comprising:
- emitting infrared light that diverges in a plane above the table and includes a virtual plane parallel to the table; and
- outputting a signal including information about the position of the finger of the user on the table with a camera on which the infrared light reflected by the finger of the user placed on the table is incident.

15. The input method according to claim 13, further comprising acquiring information about the image of the plural virtual keys based on the size of the table.

16. The input method according to claim 13, further comprising projecting the image of the plural virtual keys in accordance with the information identifying the user.

17. The input method according to claim 13, further comprising acquiring information about the image of the plural virtual keys from the information identifying the user.

18. The input method according to claim 13, inputting the information identifying the user with a user information input unit.

* * * * *